US012795158B2

(12) United States Patent
Lee et al.

(10) Patent No.: US 12,795,158 B2
(45) Date of Patent: Nov. 10, 2026

(54) POINT CLOUD DATA PROCESSING DEVICE AND PROCESSING METHOD

(71) Applicant: LG ELECTRONICS INC., Seoul (KR)

(72) Inventors: Sooyeon Lee, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 154 days.

(21) Appl. No.: 17/919,836

(22) PCT Filed: Apr. 22, 2021

(86) PCT No.: PCT/KR2021/005105
§ 371 (c)(1),
(2) Date: Oct. 19, 2022

(87) PCT Pub. No.: WO2021/215849
PCT Pub. Date: Oct. 28, 2021

(65) Prior Publication Data

US 2023/0164353 A1 May 25, 2023

(30) Foreign Application Priority Data

Apr. 22, 2020 (KR) ........................ 10-2020-0048445
Jul. 30, 2020 (KR) ........................ 10-2020-0095503

(51) Int. Cl.
*H04N 19/597* (2014.01)
*H04N 19/105* (2014.01)
(Continued)

(52) U.S. Cl.
CPC ......... *H04N 19/597* (2014.11); *H04N 19/105* (2014.11); *H04N 19/137* (2014.11); *H04N 19/159* (2014.11); *H04N 19/96* (2014.11)

(58) Field of Classification Search
CPC .. H04N 19/597; H04N 19/105; H04N 19/137; H04N 19/159; H04N 19/96;
(Continued)

(56) References Cited

U.S. PATENT DOCUMENTS 10,721,492 B2 * 7/2020 Son ...................... H04N 19/176
2012/0177123 A1 * 7/2012 Zhou ...................... H04N 19/52
375/E7.125
(Continued)

FOREIGN PATENT DOCUMENTS

KR 1020200038534 A 4/2020
WO 2019216716 A2 11/2019
(Continued)

OTHER PUBLICATIONS

L. Li et al., "Advanced 3D Motion Prediction for Video-Based Dynamic Point Cloud Compression", IEEE Transactions on Image Processing, vol. 29, pp. 289-302, Aug. 2, 2019.
(Continued)

*Primary Examiner* — Stefan Gadomski
(74) *Attorney, Agent, or Firm* — BRYAN CAVE LEIGHTON PAISNER LLP

(57) ABSTRACT

A point cloud data processing method, according to embodiments, enables encoding and transmitting point cloud data. A point cloud data processing method, according to embodiments, enables receiving and decoding point cloud data.

20 Claims, 55 Drawing Sheets

(51) Int. Cl.
*H04N 19/137* (2014.01)
*H04N 19/159* (2014.01)
*H04N 19/96* (2014.01)

(58) Field of Classification Search
CPC ....... H04N 19/537; G06T 9/001; G06T 9/004; G06T 9/40
See application file for complete search history.

(56) References Cited

U.S. PATENT DOCUMENTS

| | | | | |
|---|---|---|---|---|
| 2014/0044181 | A1* | 2/2014 | Siast | H04N 19/521 375/240.16 |
| 2015/0092857 | A1* | 4/2015 | Chen | H04N 19/513 375/240.16 |
| 2016/0110917 | A1* | 4/2016 | Iverson | G06T 17/205 345/420 |
| 2017/0347120 | A1* | 11/2017 | Chou | H04N 19/89 |
| 2017/0347122 | A1* | 11/2017 | Chou | G06T 9/00 |
| 2018/0084260 | A1* | 3/2018 | Chien | H04N 19/52 |
| 2020/0077114 | A1 | 3/2020 | Li et al. | |
| 2020/0195970 | A1* | 6/2020 | Ikai | H04N 19/146 |
| 2020/0252647 | A1* | 8/2020 | Lasserre | G06T 15/04 |
| 2020/0258247 | A1* | 8/2020 | Lasserre | G06T 15/205 |
| 2020/0279404 | A1* | 9/2020 | Vosoughi | G06T 9/00 |
| 2020/0280710 | A1* | 9/2020 | Vosoughi | H04N 19/137 |
| 2020/0294271 | A1* | 9/2020 | Ilola | G06T 17/20 |
| 2020/0304823 | A1* | 9/2020 | Yea | G06T 9/001 |
| 2020/0304829 | A1* | 9/2020 | Yea | H04N 19/547 |
| 2021/0029355 | A1* | 1/2021 | Zhu | H04N 19/96 |
| 2021/0067798 | A1* | 3/2021 | Chujoh | H04N 19/176 |
| 2021/0127134 | A1* | 4/2021 | Jeong | H04N 19/44 |
| 2021/0144403 | A1* | 5/2021 | Lasserre | G06T 9/001 |
| 2021/0192798 | A1* | 6/2021 | Lasserre | G06T 9/004 |
| 2021/0217202 | A1* | 7/2021 | Zakharchenko | H04N 19/597 |
| 2021/0279522 | A1* | 9/2021 | Huang | G06N 3/08 |
| 2021/0281874 | A1* | 9/2021 | Lasserre | H03M 7/3071 |
| 2022/0191520 | A1* | 6/2022 | Kato | H04N 19/597 |

FOREIGN PATENT DOCUMENTS

| | | | | |
|---|---|---|---|---|
| WO | WO-2020072579 | A1 * | 4/2020 | H04N 19/56 |
| WO | WO-2020075861 | A1 * | 4/2020 | G06T 9/001 |

OTHER PUBLICATIONS

K. Mammou et al., “G-PCC codec description v2”, International Organisation For Standardisation Organisation Internale De Normalisation ISO/IEC JTC1/SC29/WG11 Coding Of Moving Pictures And Audio, N18189, Jan. 2019.

* cited by examiner

FIG. 26

| seq_parameter_set ( ) { | Descriptor |
|---|---|
| ... | |
| pu_coding_flag | u(1) |
| if(pu_coding_flag) { | |
| frame_pu_split_flag | u(1) |
| split_pu_initial_criteria | ue(v) |
| split_pu_criteria_update_flag | u(1) |
| split_pu_threshold | ue(v) |
| initial_split_mode | ue(v) |
| initial_length_width | ue(v) |
| initial_length_height | ue(v) |
| initial_length_depth | ue(v) |
| if(!frame_pu_split_flag) { | |
| split_pu_max_node_size_ | ue(v) |
| } | |
| max_split_pu_level | ue(v) |
| } | |
| ... | |
| } | |

FIG. 27

| tile_parameter_set( ) { | Descriptor |
|---|---|
| ... | |
| pu_coding_flag | u(1) |
| if(pu_coding_flag) { | |
| frame_pu_split_flag | u(1) |
| split_pu_initial_criteria | ue(v) |
| split_pu_criteria_update_flag | u(1) |
| split_pu_threshold | ue(v) |
| initial_split_mode | ue(v) |
| initial_length_width | ue(v) |
| initial_length_height | ue(v) |
| initial_length_depth | ue(v) |
| if(!frame_pu_split_flag) { | |
| split_pu_max_node_size_log2 | ue(v) |
| } | |
| max_split_pu_level | ue(v) |
| } | |
| ... | |
| } | |

FIG. 28

| geometry_parameter_set( ) { | Descriptor |
|---|---|
| ... | |
| pu_coding_flag | u(1) |
| if(pu_coding_flag) { | |
| frame_pu_split_flag | u(1) |
| split_pu_initial_criteria | ue(v) |
| split_pu_criteria_update_flag | u(1) |
| split_pu_threshold | ue(v) |
| initial_split_mode | ue(v) |
| initial_length_width | ue(v) |
| initial_length_height | ue(v) |
| initial_length_depth | ue(v) |
| if(!frame_pu_split_flag) { | |
| split_pu_max_node_size_log2 | ue(v) |
| } | |
| max_split_pu_level | ue(v) |
| } | |
| ... | |
| } | |

FIG. 29

| attribute_parameter_set( ) { | Descriptor |
|---|---|
| ... | |
| pu_coding_flag | u(1) |
| if(pu_coding_flag) { | |
| frame_pu_split_flag | u(1) |
| split_pu_initial_criteria | ue(v) |
| split_pu_criteria_update_flag | u(1) |
| split_pu_threshold | ue(v) |
| initial_split_mode | ue(v) |
| initial_length_width | ue(v) |
| initial_length_height | ue(v) |
| initial_length_depth | ue(v) |
| if(!frame_pu_split_flag) { | |
| split_pu_max_node_size_log2 | ue(v) |
| } | |
| max_split_pu_level | ue(v) |
| } | |
| ... | |
| } | |

FIG. 30

| |
|---|
| geometry_slice_header( ) { |
| ... |
|     pu_coding_flag |
|     if(pu_coding_flag) { |
|         frame_pu_split_flag |
|             split_pu_initial_criteria |
|             split_pu_initial_criteria |
|             split_pu_criteria_update_flag |
|             split_pu_threshold |
|             initial_split_mode |
|             initial_length_width |
|             initial_length_height |
|             initial_length_depth |
|             if(!frame_pu_split_flag) { |
|                 split_pu_max_node_size_log2 |
|             } |
|             max_split_pu_level |
|     } |
| ... |
| } |

FIG. 31

| geometry_slice_data( ) { | Descriptor |
| --- | --- |
| ... | |
| pu_coding_flag | u(1) |
| if(pu_coding_flag) { | |
| frame_pu_split_flag | u(1) |
| split_pu_initial_criteria | ue(v) |
| split_pu_criteria_update_flag | u(1) |
| split_pu_threshold | ue(v) |
| initial_split_mode | ue(v) |
| initial_length_width | ue(v) |
| initial_length_height | ue(v) |
| initial_length_depth | ue(v) |
| if(!frame_pu_split_flag) { | |
| split_pu_max_node_size_log2 | ue(v) |
| } | |
| max_split_pu_level | ue(v) |
| } | |
| ... | |
| } | |

| seq_parameter_set_rbsp( ) { | Descriptor |
|---|---|
| ... | |
| MMV_flag | u(1) |
| if(MMV_flag) { | |
| num_of_MMV_list | ue(v) |
| for(i=0; i< num_of_MMV_list;i++){ | ue(v) |
| num_MMV_list_component | ue(v) |
| MMV | ue(v) |
| MMV_threshold | ue(v) |
| allow_use_next_frame | u(1) |
| core_PU_index | ue(v) |
| for(j=0;j<num_MMV_list_component;j++){ | ue(v) |
| PU_position | ue(v) |
| PU_size | ue(v) |
| PU_index | ue(v) |
| MMV_residual | ue(v) |
| } | |
| } | ue(v) |
| } | |
| } | |

FIG. 42

| tile_parameter_set( ) { | Descriptor |
|---|---|
| ... | |
| MMV_flag | u(1) |
| if(MMV_flag) { | |
| num_of_MMV_list | ue(v) |
| for(i=0; i< num_of_MMV_list;i++){ | ue(v) |
| num_MMV_list_component | ue(v) |
| MMV | ue(v) |
| MMV_threshold | ue(v) |
| allow_use_next_frame | u(1) |
| core_PU_index | ue(v) |
| for(j=0;j<num_MMV_list_component;j++){ | ue(v) |
| PU_position | ue(v) |
| PU_size | ue(v) |
| PU_index | ue(v) |
| MMV_residual | ue(v) |
| } | |
| } | ue(v) |
| } | |
| } | |

FIG. 43

| geometry_parameter_set( ) { | Descriptor |
|---|---|
| ... | |
| MMV_flag | u(1) |
| if(MMV_flag) { | |
| num_of_MMV_list | ue(v) |
| for(i=0; i< num_of_MMV_list;i++){ | ue(v) |
| num_MMV_list_component | ue(v) |
| MMV | ue(v) |
| MMV_threshold | ue(v) |
| allow_use_next_frame | u(1) |
| core_PU_index | ue(v) |
| for(j=0;j<num_MMV_list_component;j++){ | ue(v) |
| PU_position | ue(v) |
| PU_size | ue(v) |
| PU_index | ue(v) |
| MMV_residual | ue(v) |
| } | |
| } | ue(v) |
| } | |
| ... | |
| } | |

FIG. 44

| attribute_parameter_set( ) { | Descriptor |
| --- | --- |
| ... | |
| MMV_flag | u(1) |
| if(MMV_flag) { | |
| num_of_MMV_list | ue(v) |
| for(i=0; i< num_of_MMV_list;i++){ | ue(v) |
| num_MMV_list_component | ue(v) |
| MMV | ue(v) |
| MMV_threshold | ue(v) |
| allow_use_next_frame | u(1) |
| core_PU_index | ue(v) |
| for(j=0;j<num_MMV_list_component;j++){ | ue(v) |
| PU_position | ue(v) |
| PU_size | ue(v) |
| PU_index | ue(v) |
| MMV_residual | ue(v) |
| } | |
| } | ue(v) |
| } | |
| ... | |
| } | |

FIG. 45

| geometry_slice_header( ) { | Descriptor |
|---|---|
| ... | |
| MMV_flag | u(1) |
| if(MMV_flag) { | |
| num_of_MMV_list | ue(v) |
| for(i=0; i< num_of_MMV_list;i++){ | ue(v) |
| num_MMV_list_component | ue(v) |
| MMV | ue(v) |
| MMV_threshold | ue(v) |
| allow_use_next_frame | u(1) |
| core_PU_index | ue(v) |
| for(j=0;j<num_MMV_list_component;j++){ | ue(v) |
| PU_position | ue(v) |
| PU_size | ue(v) |
| PU_index | ue(v) |
| MMV_residual | ue(v) |
| } | |
| } | ue(v) |
| } | |
| ... | |
| } | |

FIG. 46

| geometry_slice_data( ) { | Descriptor |
|---|---|
| ... | |
| MMV_flag | u(1) |
| if(MMV_flag) { | |
| num_of_MMV_list | ue(v) |
| for(i=0; i< num_of_MMV_list;i++){ | ue(v) |
| num_MMV_list_component | ue(v) |
| MMV | ue(v) |
| MMV_threshold | ue(v) |
| allow_use_next_frame | u(1) |
| core_PU_index | ue(v) |
| for(j=0;j<num_MMV_list_component;j++){ | ue(v) |
| PU_position | ue(v) |
| PU_size | ue(v) |
| PU_index | ue(v) |
| MMV_residual | ue(v) |
| } | |
| } | ue(v) |
| } | |
| ... | |
| } | |

FIG. 49

| seq_parameter_set_rbsp( ) { | Descriptor |
|---|---|
| ... | |
| pu_coding_flag | u(1) |
| if (pu_coding_flag) { | |
| frame_pu_split_flag | u(1) |
| split_pu_initial_criteria | ue(v) |
| split_pu_threshold | ue(v) |
| initial_split_mode | ue(v) |
| initial_length_width | ue(v) |
| initial_length_height | ue(v) |
| initial_length_depth | ue(v) |
| if(!frame_pu_split_flag) { | |
| split_pu_max_node_size_ | ue(v) |
| } | |
| max_split_pu_level_sps | ue(v) |
| | |
| MMV_flag | u(1) |
| if(MMV_flag) { | |
| num_of_MMV_list | ue(v) |
| allow_use_next_frame_sps | u(1) |
| } | |
| } | |
| ... | |
| } | |

FIG. 50

| tile_parameter_set( ) { | Descriptor |
|---|---|
| ... | |
| if(pu_coding_flag) { | |
| initial_split_mode | ue(v) |
| initial_length_width | ue(v) |
| initial_length_height | ue(v) |
| initial_length_depth | ue(v) |
| } | |
| } | |

FIG. 51

| geometry_parameter_set( ) { | Descriptor |
|---|---|
| ... | |
| if(pu_coding_flag) { | ue(v) |
| split_pu_initial_criteria | u(1) |
| split_pu_criteria_update_flag | ue(v) |
| split_pu_threshold | ue(v) |
| initial_split_mode | |
| if(!frame_pu_split_flag) | ue(v) |
| max_split_pu_level_gps | ue(v) |
| num_PU | |
| for(i=0; i<num_PU<i++) | ue(v) |
| PU_index[i] | ue(v) |
| PU_split_mode[i] | |
| if(MMV_flag) { | ue(v) |
| num_of_MMV_list | ue(v) |
| MMV_threshold | u(1) |
| allow_use_next_frame_gps | ue(v) |
| for(j=0; j< num_of_MMV_list;j++){ | ue(v) |
| num_MMV_list_component[j] | ue(v) |
| MMV_list_index[j] | ue(v) |
| MMV[j] | ue(v) |
| core_PU_index | ue(v) |
| for(k=0;k<size(num_MMV_list_component[j]);k++){ | ue(v) |
| MMV_PU_index[k] | ue(v) |
| MMV_residual[k] | se(v) |
| } | |
| } | |
| } | |
| ... | |
| } | |

FIG. 52

| attribute_parameter_set( ) { | Descriptor |
|---|---|
| ... | |
| if(pu_coding_flag) { | ue(v) |
| split_pu_initial_criteria | u(1) |
| split_pu_criteria_update_flag | ue(v) |
| split_pu_threshold | ue(v) |
| initial_split_mode | |
| if(!frame_pu_split_flag) | ue(v) |
| max_split_pu_level_aps | ue(v) |
| num_PU | |
| for(i=0; i<num_PU<i++) | ue(v) |
| PU_index[i] | ue(v) |
| PU_split_mode[i] | |
| if(MMV_flag) { | ue(v) |
| num_of_MMV_list | ue(v) |
| MMV_threshold | u(1) |
| allow_use_next_frame_gps | ue(v) |
| for(j=0; j< num_of_MMV_list;j++){ | ue(v) |
| num_MMV_list_component[j] | ue(v) |
| MMV_list_index[j] | ue(v) |
| MMV[j] | ue(v) |
| core_PU_index | ue(v) |
| for(k=0;k<size(num_MMV_list_component[j]);k++){ | ue(v) |
| MMV_PU_index[k] | ue(v) |
| MMV_residual[k] | se(v) |
| } | |
| } | |
| } | |
| ... | |
| } | |

FIG. 53

| geometry_slice_header( ) { | Descriptor |
|---|---|
| ... | |
| if(pu_coding_flag) { | |
| split_pu_initial_criteria | ue(v) |
| split_pu_criteria_update_flag | u(1) |
| split_pu_threshold | ue(v) |
| initial_split_mode | ue(v) |
| num_PU | ue(v) |
| for(i=0; i<num_PU<i++) | |
| PU_index[i] | ue(v) |
| PU_split_mode[i] | ue(v) |
| if(MMV_flag) { | |
| num_of_MMV_list | ue(v) |
| MMV_threshold | ue(v) |
| allow_use_next_frame | u(1) |
| for(j=0; j< num_of_MMV_list;j++){ | ue(v) |
| num_MMV_list_component[j] | ue(v) |
| MMV[j] | ue(v) |
| core_PU_index | ue(v) |
| for(k=0;k<size(num_MMV_list_component[j]);k++){ | ue(v) |
| MMV_PU_index[k] | ue(v) |
| MMV_residual[k] | se(v) |
| } | |
| } | |
| } | |
| ... | |
| } | |

POINT CLOUD DATA PROCESSING DEVICE AND PROCESSING METHOD

This application is the National Stage filing under 35 U.S.C. 371 of International Application No. PCT/KR2021/005105 filed on Apr. 22, 2021, which claims priority to Korean Patent Application Nos. 10-2020-0048445 filed on Apr. 22, 2020 and 10-2020-00095503 filed on Jul. 30, 2020, the contents of which are all hereby incorporated by reference herein in their entirety.

TECHNICAL FIELD

The present disclosure provides a method for providing point cloud contents to provide a user with various services such as virtual reality (VR), augmented reality (AR), mixed reality (MR), and self-driving services.

BACKGROUND ART

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

DISCLOSURE

Technical Problem

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

Technical Solution

Therefore, to efficiently process point cloud data, a point cloud data transmission method according to embodiments includes encoding point cloud data including a geometry and an attribute, and transmitting a bitstream containing the encoded point cloud data. According to the embodiments, the geometry is information representing positions of points of the point cloud data, and the attribute includes at least one of a color or a reflectance of the points.

A point cloud data transmission device according to embodiments includes an encoder configured to encode point cloud data including a geometry and an attribute, and a transmitter configured to transmit a bitstream containing the encoded point cloud data.

A point cloud data transmission method according to embodiments includes receiving a bitstream containing point cloud data, and decoding the point cloud data. According to the embodiments, the geometry is information representing positions of points of the point cloud data, and the attribute includes at least one of a color or a reflectance of the points.

A point cloud data processing device according to embodiments includes a receiver configured to receive a bitstream containing point cloud data, and a decoder configured to decode the point cloud data. According to the embodiments, the geometry is information representing positions of points of the point cloud data, and the attribute includes at least one of a color or a reflectance of the points.

Advantageous Effects

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 26 shows an example of a syntax structure of signaling information related to PU splitting;

FIG. 27 shows an example of a syntax structure of signaling information related to PU splitting;

FIG. 28 shows an example of a syntax structure of signaling information related to PU splitting;

FIG. 29 shows an example of a syntax structure of signaling information related to PU splitting;

FIG. 30 shows an example of a syntax structure of signaling information related to PU splitting;

FIG. 31 shows an example of a syntax structure of signaling information related to PU splitting;

FIG. 42 shows an example of a syntax structure of signaling information related to PU merging;

FIG. 43 shows an example of a syntax structure of signaling information related to PU merging;

FIG. 44 shows an example of a syntax structure of signaling information related to PU merging;

FIG. 45 shows an example of a syntax structure of signaling information related to PU merging;

FIG. 46 shows an example of a syntax structure of signaling information related to PU merging;

FIG. 49 shows a syntax structure of signaling information related to PU splitting and PU merging;

FIG. 50 shows a syntax structure of signaling information related to PU splitting and PU merging;

FIG. 51 shows a syntax structure of signaling information related to PU splitting and PU merge merging;

FIG. 52 shows a syntax structure of signaling information related to PU splitting and PU merging;

FIG. 53 shows a syntax structure of signaling information related to PU splitting and PU merging;

BEST MODE

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
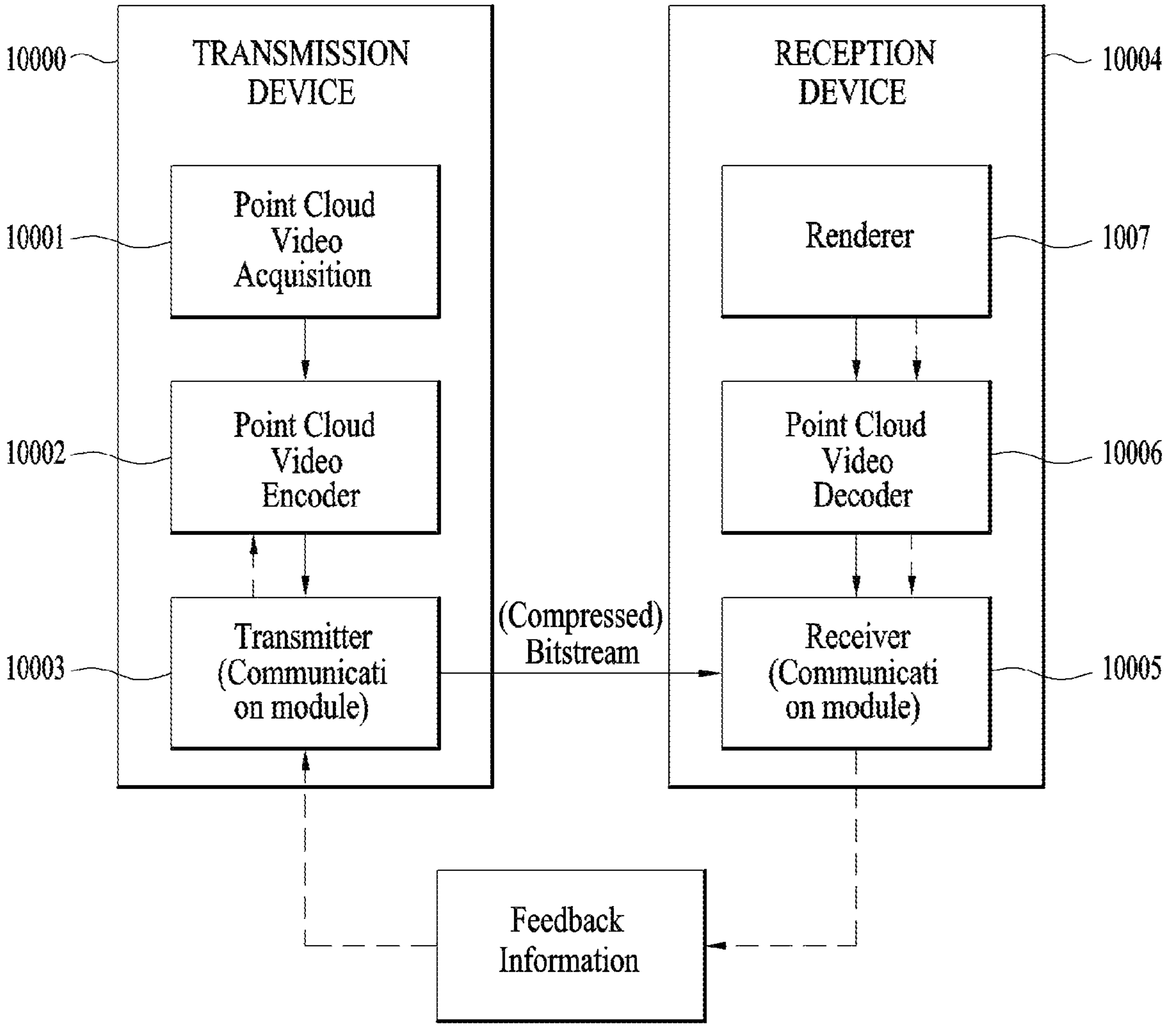
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
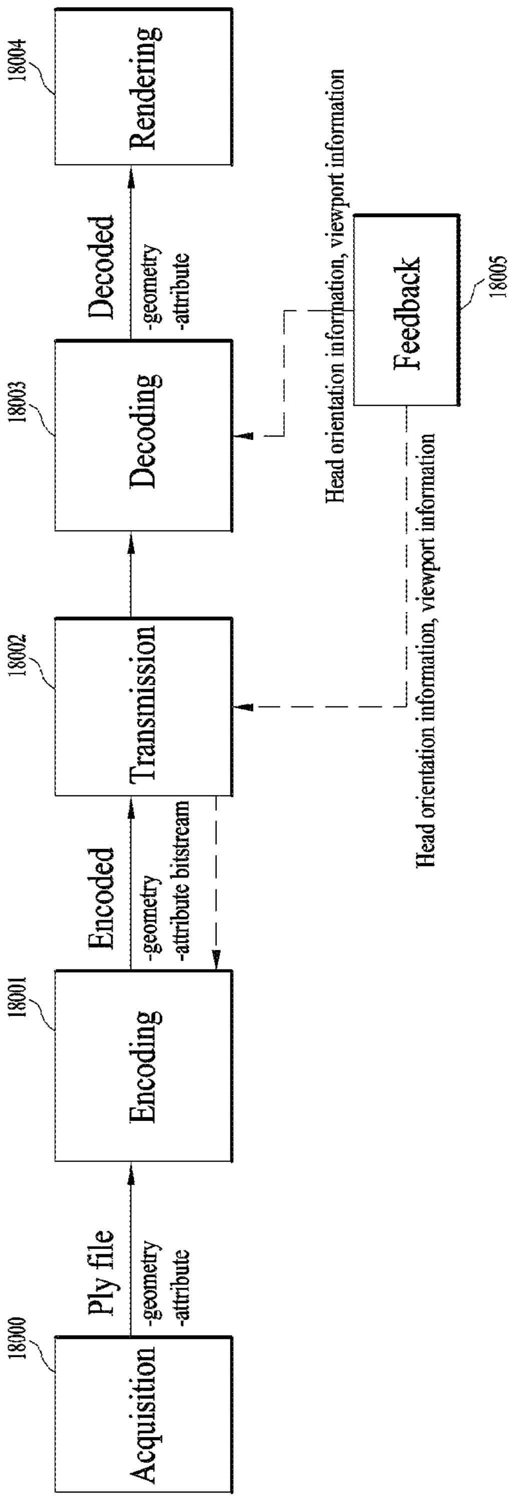
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
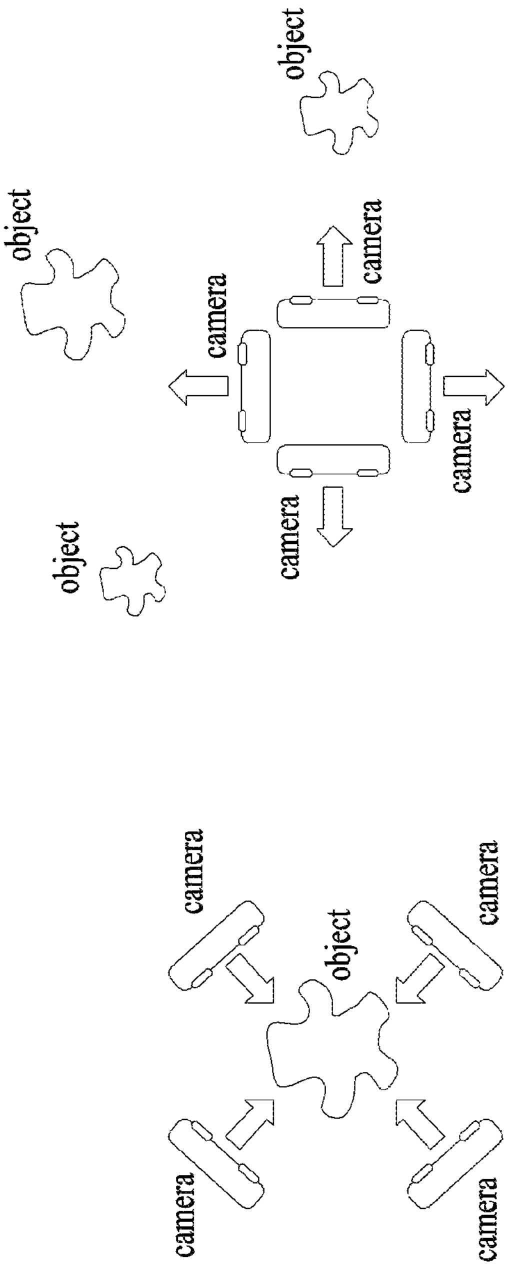
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
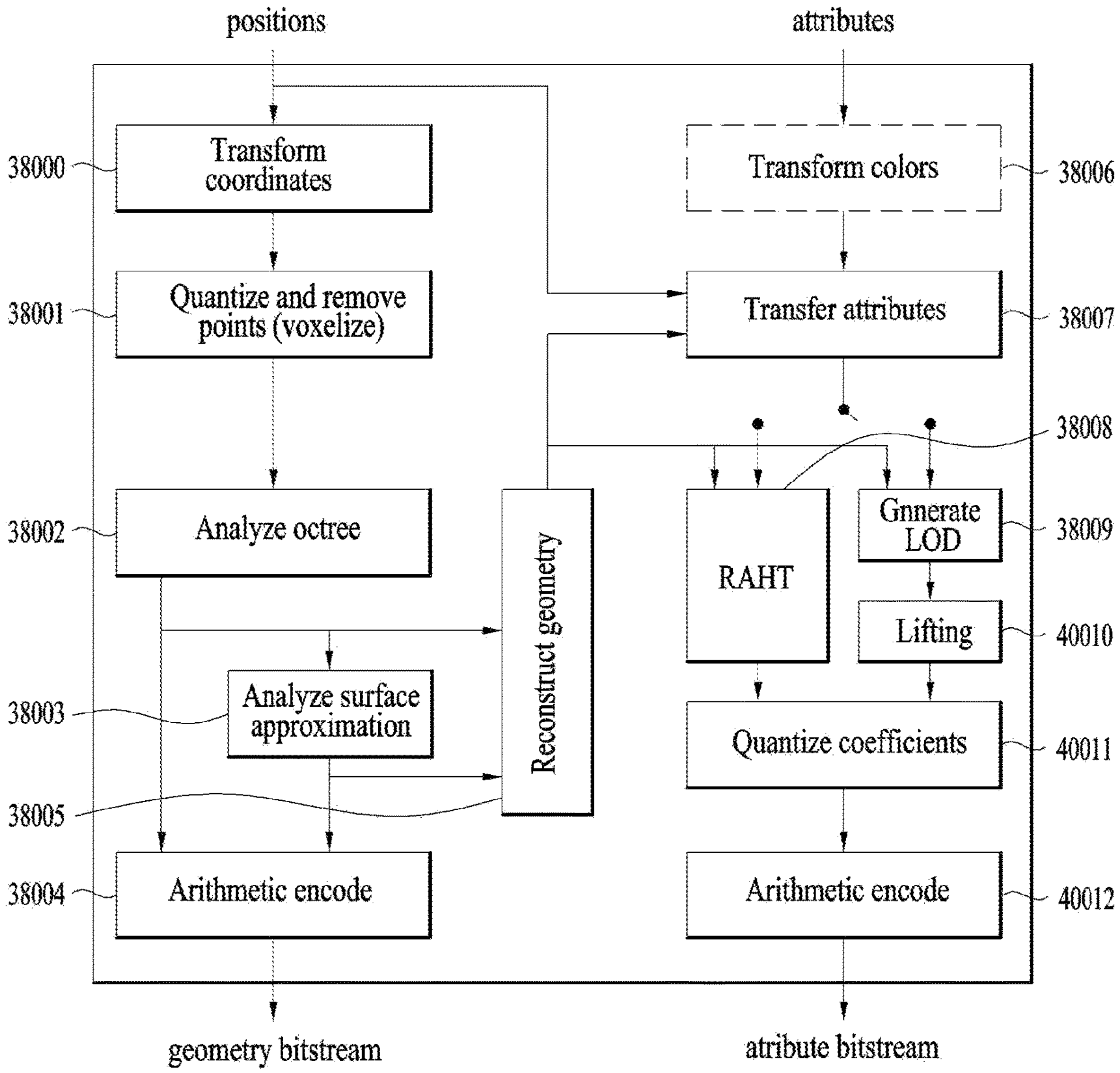
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1.

The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 to 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
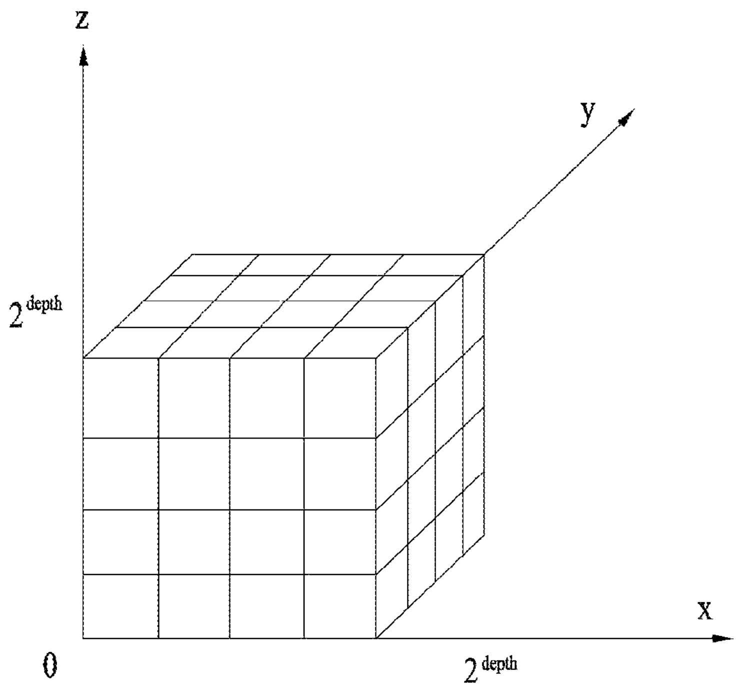
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

Figure 6:
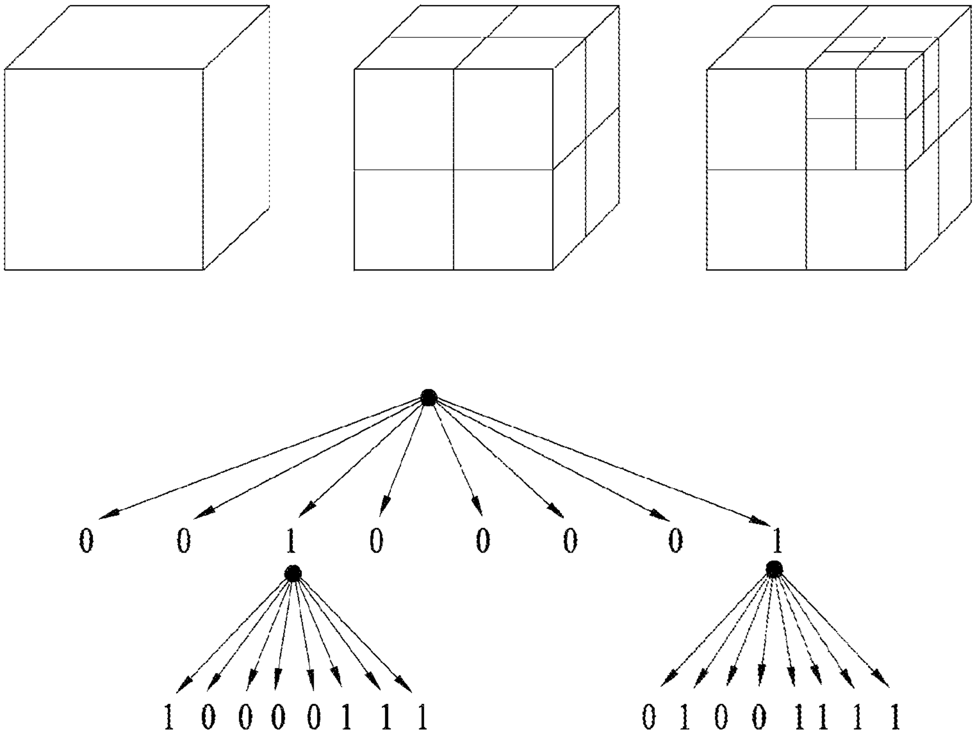
FIG. 6 shows an example of an octree and occupancy code according to embodiments.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, 2d may be set to a value constituting the smallest bounding box surrounding all points of the point cloud content (or point cloud video). Here, d denotes the depth of the octree. The value of d is determined in the following equation. In the following equation, ($x^{int}_n$, $y^{int}_n$, $z^{int}_n$) denotes the positions (or position values) of quantized points.

$$d = Ceil\left(\text{Log2}\left(\text{Max}\left(x_n^{int}, y_n^{int}, z_n^{int}, n = 1, \ldots, N\right) + 1\right)\right)$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\begin{bmatrix}\mu_x\\ \mu_y\\ \mu_z\end{bmatrix} = \frac{1}{n}\sum_{i=1}^{n}\begin{bmatrix}x_i\\ y_i\\ z_i\end{bmatrix}; \quad \text{i)}$$

$$\begin{bmatrix}\bar{x}_i\\ \bar{y}_i\\ \bar{z}_i\end{bmatrix} = \begin{bmatrix}x_i\\ y_i\\ z_i\end{bmatrix} - \begin{bmatrix}\mu_x\\ \mu_y\\ \mu_z\end{bmatrix}; \quad \text{ii)}$$

$$\begin{bmatrix}\sigma_x^2\\ \sigma_y^2\\ \sigma_z^2\end{bmatrix} = \sum_{i=1}^{n}\begin{bmatrix}\bar{x}_i^2\\ \bar{y}_i^2\\ \bar{z}_i^2\end{bmatrix} \quad \text{iii)}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through atan 2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1

Triangles formed from vertices ordered 1, . . . , n

| n | triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

Figure 7:
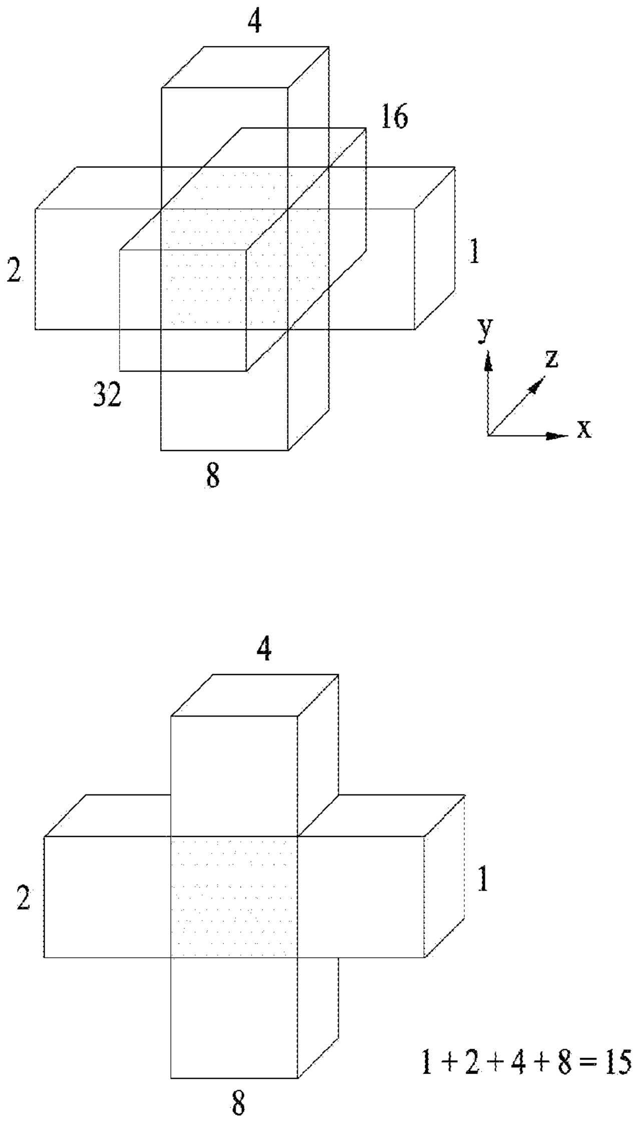
FIG. 7 shows an example of a neighbor node pattern according to embodiments.

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
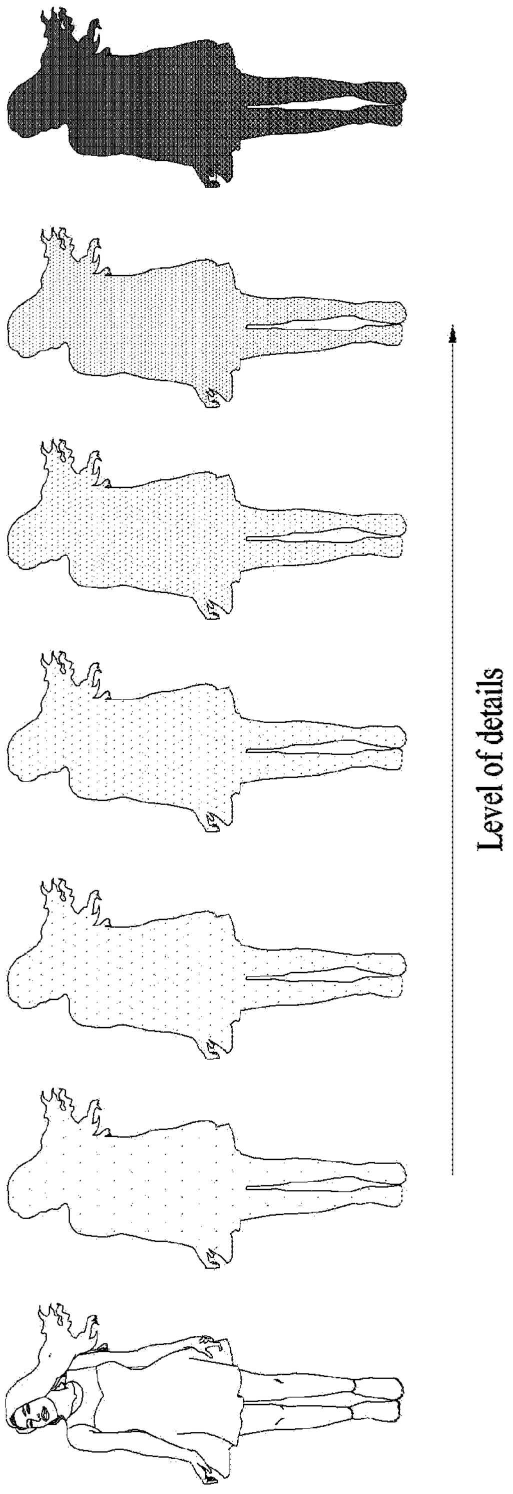
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
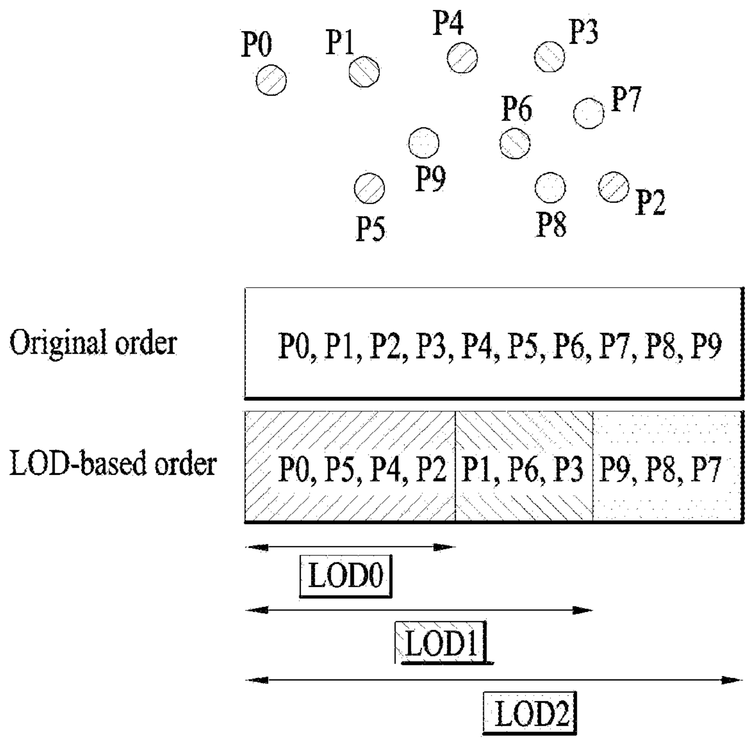
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE Attribute prediction residuals quantization pseudo code

```
int PCCQuantization(int value, int quantStep) {
if( value >=0) {
return floor(value / quantStep + 1.0 / 3.0);
} else {
return -floor(-value / quantStep + 1.0 / 3.0);
}
}
```

TABLE Attribute prediction residuals inverse quantization pseudo code

```
int PCCInverseQuantization(int value, int quantStep) {
if( quantStep ==0) {
return value;
} else {
return value * quantStep;
}
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix}, \; T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}}=w_{l_{2x,y,z}}+w_{l_{2x+1,y,z}}$. The root node is created through the and $g_{1_{0,0,0}}$ and $g_{1_{0,0,1}}$ as follows.

$$\begin{bmatrix} gDC \\ h_{0_{0,0,0}} \end{bmatrix} = T_{w1000w1001} \begin{bmatrix} g_{1_{0,0,0z}} \\ g_{1_{0,0,1}} \end{bmatrix}$$

Figure 10:
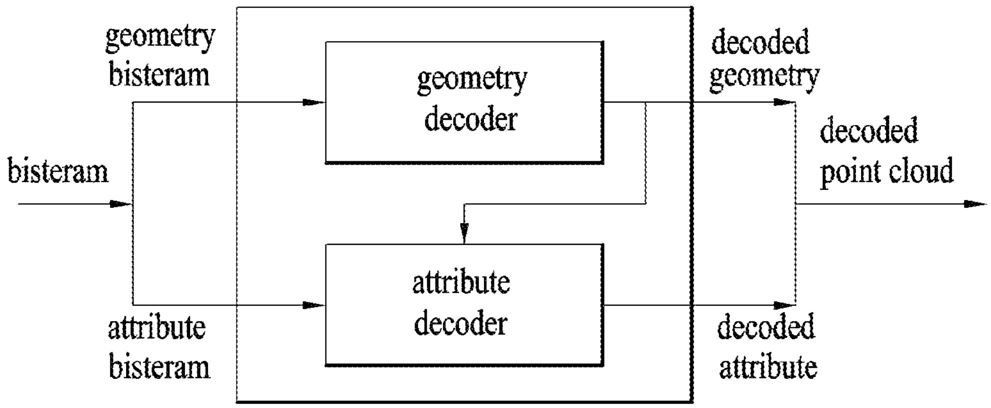
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
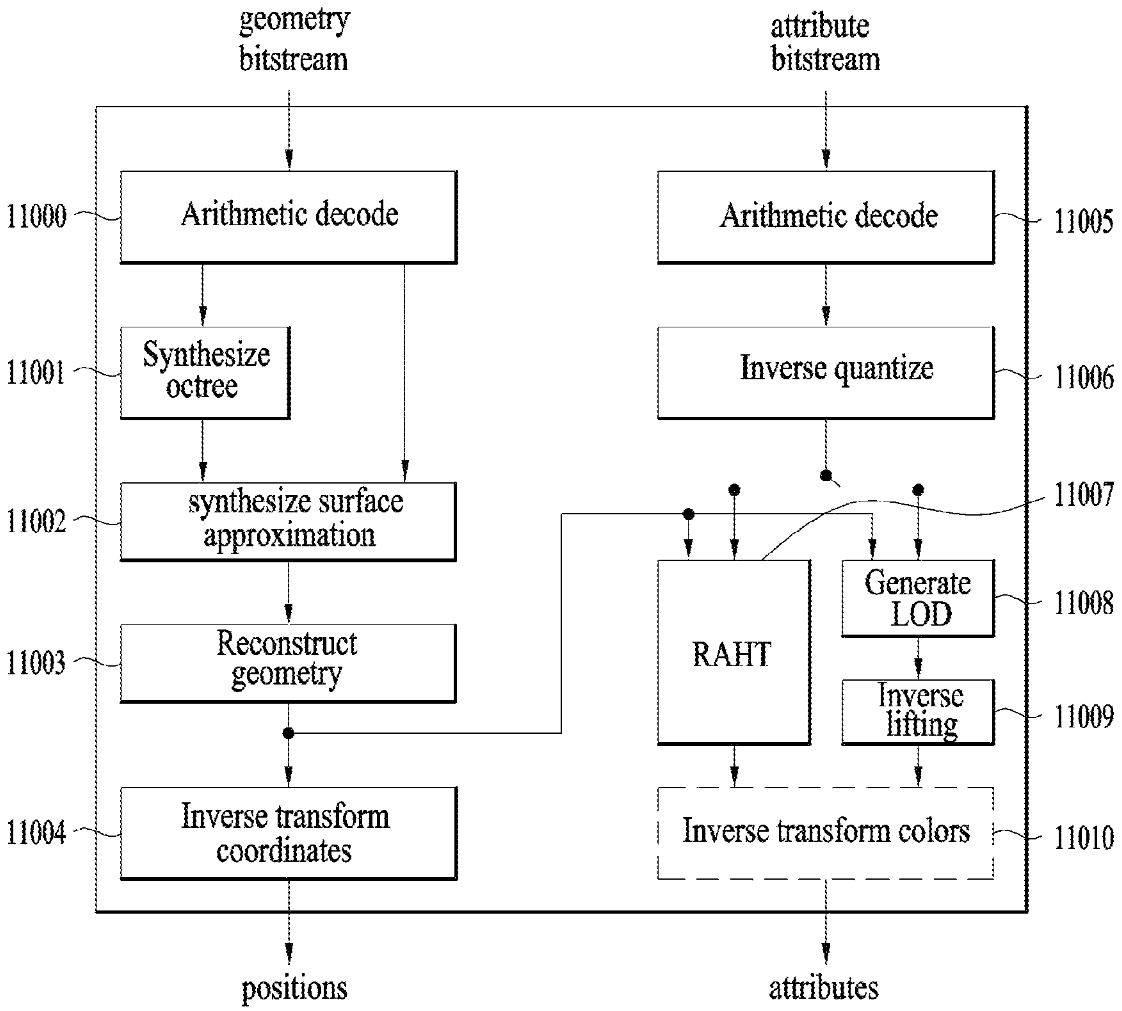
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
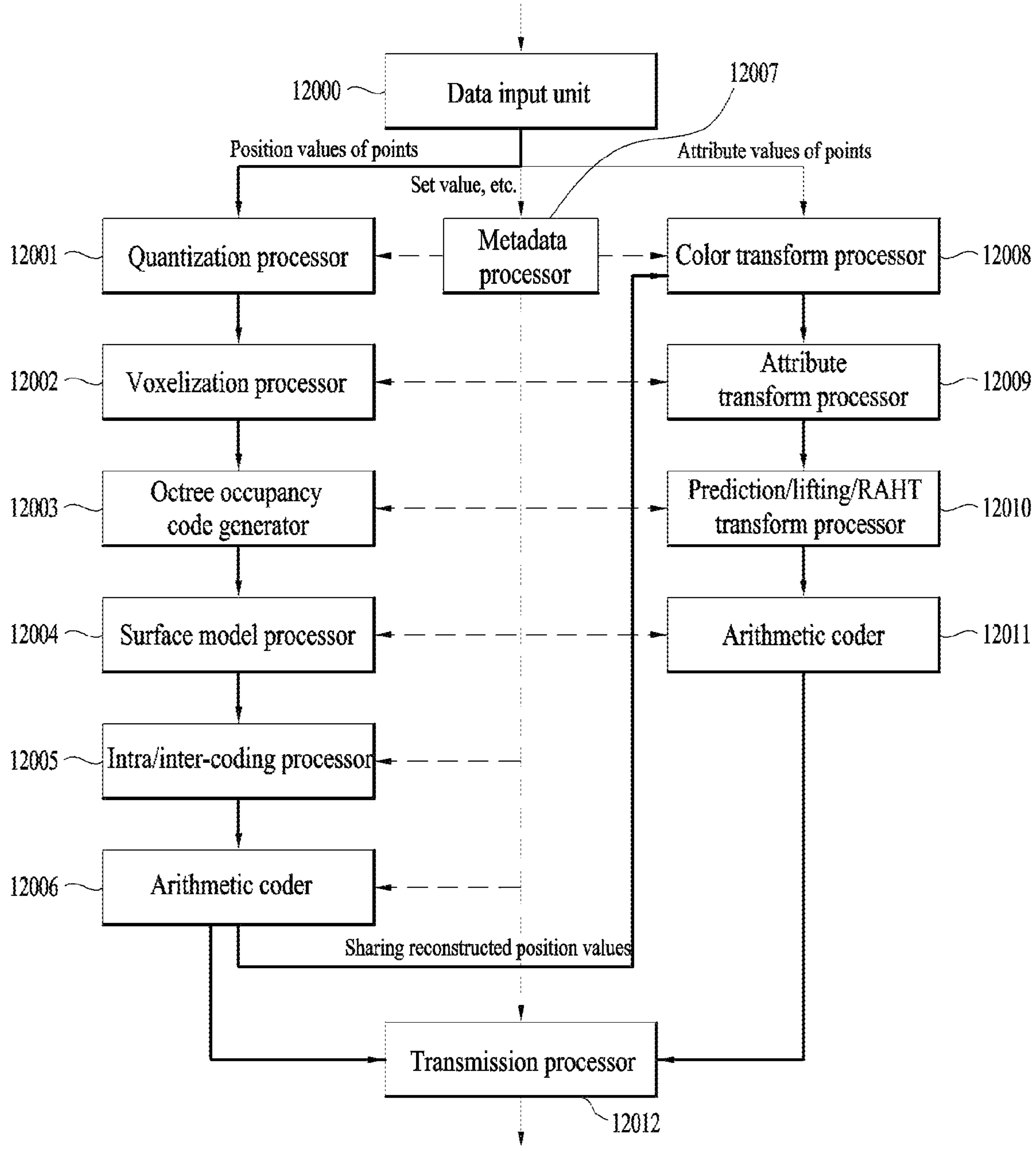
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trigsoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom00 and one or more attribute bitstreams Attr00 and Attr10.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
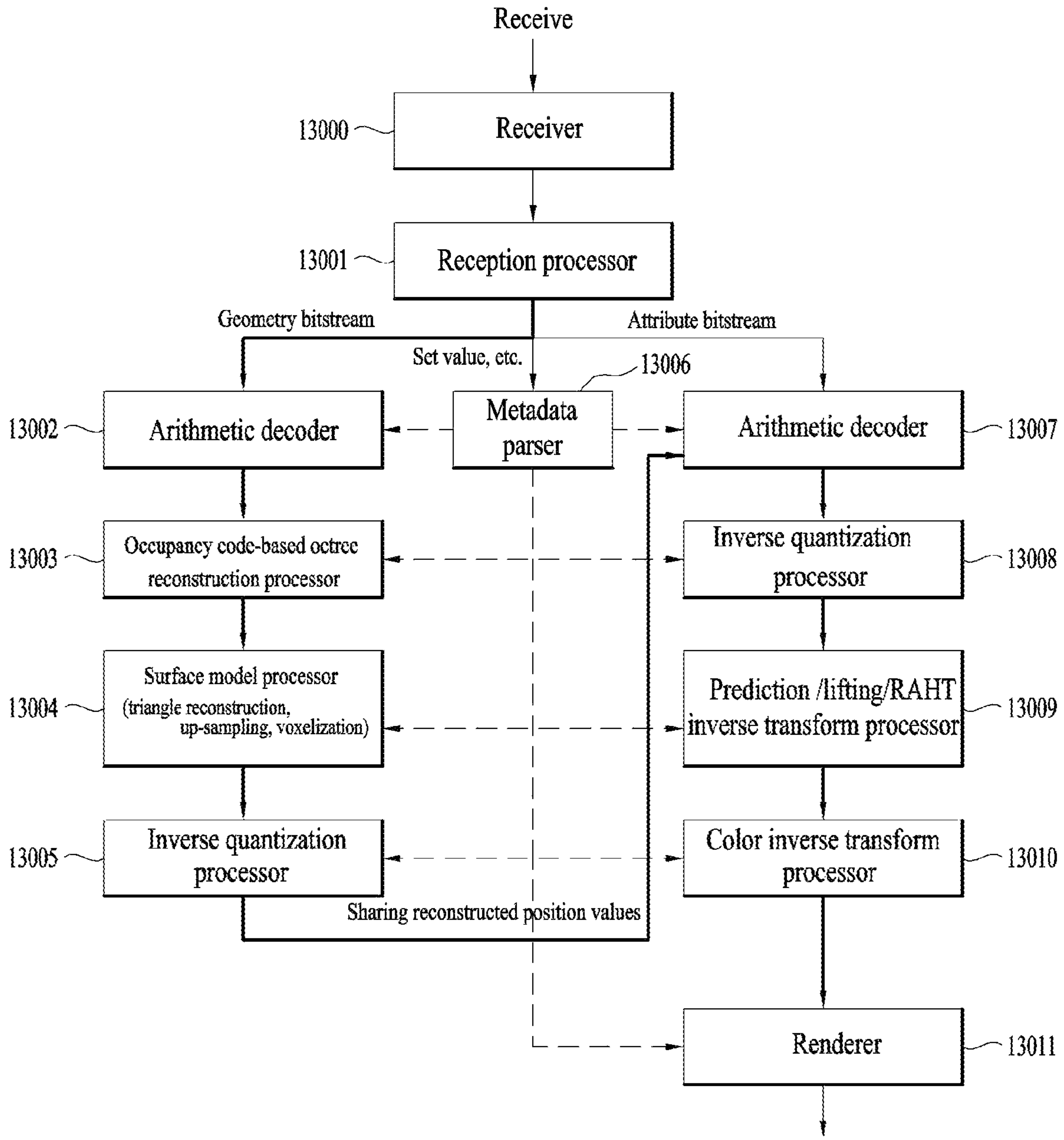
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 13005 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (for example, triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
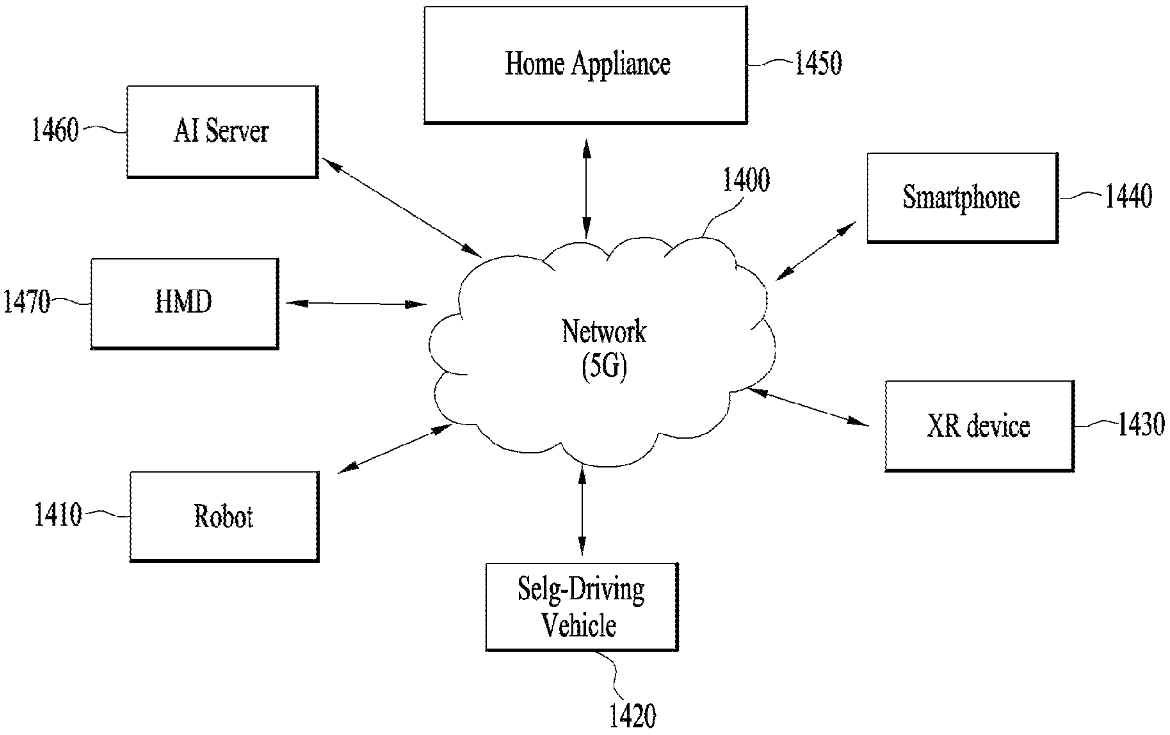
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

As described above with reference to FIGS. 1 to 14, the point cloud encoder (e.g., the quantizer 40001 in FIG. 4, the quantization processor 12001 in FIG. 12, or the voxelization processor 12002 in FIG. 12) may perform quantization and voxelization to facilitate compression of the input point cloud data (e.g., geometry). The point cloud encoder according to the embodiments may split the point cloud data into prediction units (which may be described as PUs below) in order to perform inter prediction on the processed point cloud data. According to embodiments, a PU is a unit in which inter prediction is performed and may be referred to as a unit, a region, or the like. Embodiments are not limited to this example. The point cloud encoder according to the embodiments may determine a PU split range for PU splitting from a specific node size of a frame unit or an octree structure included in the point cloud data to a size of a PU, which is a unit for inter prediction. According to embodiments, a PU may be split according to a PU tree structure, and a range for splitting/generating a PU is called a PU split range. However, point cloud data may be unevenly distributed in a 3D coordinate system. When the PU size and PU splitting range are determined in the same way for all axes of the coordinate system without considering such data distribution, points with poor similarity may belong to the PU. In this case, the accuracy of motion estimation/compensation may decrease, and accordingly overall compression performance may be lowered. Accordingly, the point cloud encoder according to the embodiments scans a distribution area of points constituting the entire stream or frame (e.g., random access point/intra prediction/reference frame, etc.) to perform PU splitting in consideration of the distribution characteristics of the point cloud content. According to embodiments, the split PU may be split by the same splitting method as that applied to the previously split PU, or may be split by another different splitting method according to the distribution characteristics of the point cloud content. In addition, splitting the PU may be skipped depending on presence/absence of data included in the PU or the state of the data.

As described with reference to FIGS. 1 to 14, the point cloud decoder (e.g., the point cloud decoder in FIGS. 10 and 11 or the reception device in FIG. 13) may receive a bitstream and perform entropy decoding to restore a residual, which is a prediction error for a point of the point cloud data. The point cloud decoder may secure information about a motion vector (hereinafter, referred to as MV) for each PU based on signaling information related to inter prediction and predict a point value within a PU range of the current frame.

Figure 15:
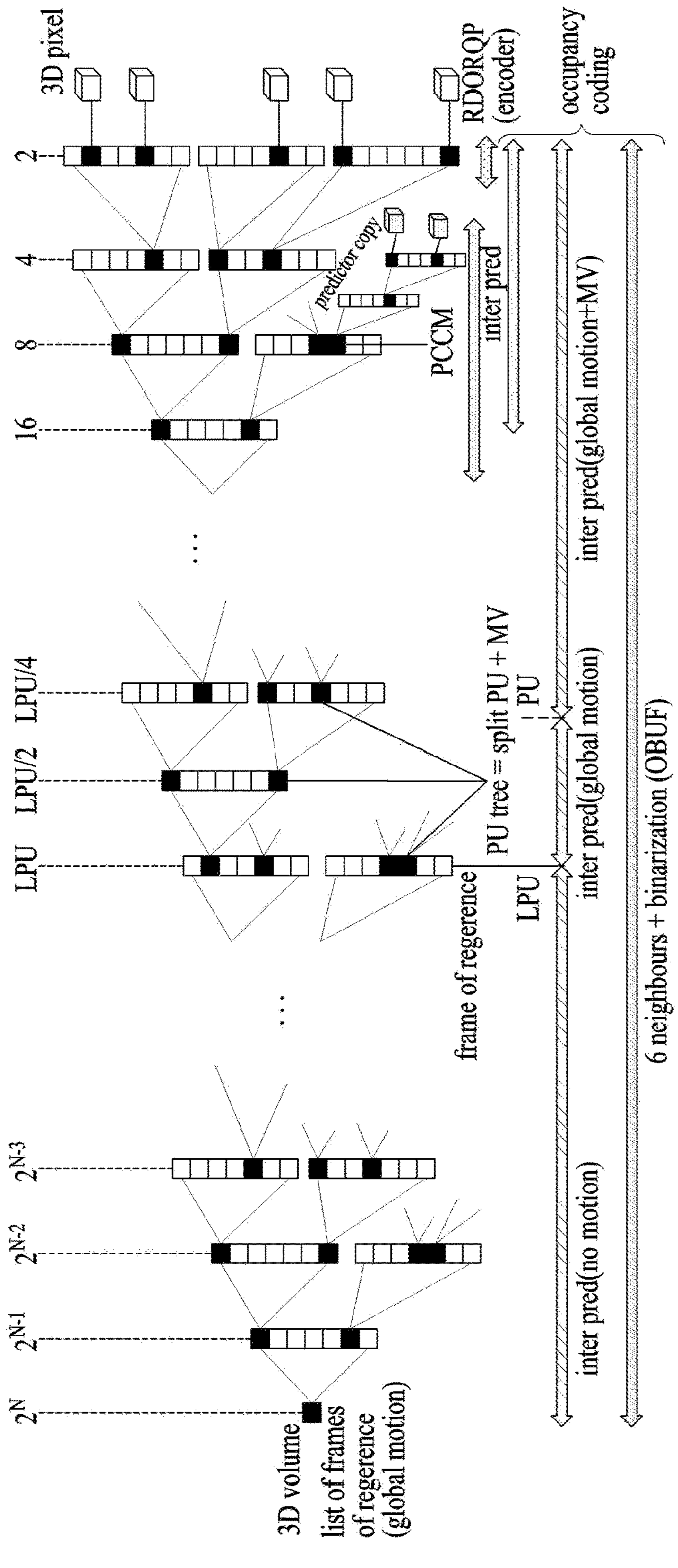
FIG. 15 illustrates an example of a prediction unit of inter prediction according to embodiments.

FIG. 15 illustrates an example of a prediction unit of inter prediction according to embodiments.

The left part of FIG. 15 shows an octree structure. As described with reference to FIGS. 1 to 14, a bounding box containing all points of point cloud data is split into eight nodes having the same size, and the split eight nodes are each recursively split into eight nodes of the same size. That is, as shown in the figure, each node becomes a parent node of 8 child nodes in the direction from the root node represented by 2n to the lower node (e.g., 2n−1 node, 2n−2 node). Each child node again becomes the parent node of other 8 child nodes according to splitting. Each of the eight split nodes (e.g., a 2n−1 node) shown in the figure corresponds to an octree depth. The octree depth decreases as the position proceeds to a child node and reaches 0 at a leaf node. Also, black rectangles among the nodes shown in the figure (e.g., two black rectangles among the 8 nodes of 2n−1) indicate that point cloud data is present in the nodes, and white rectangles indicate that point cloud data is not present in the nodes. Therefore, only upper nodes having data are split into 8 child nodes.

The center part of FIG. 15 shows a largest prediction unit (LPU). For point cloud data split according to the octree splitting method, when a specific node (or node size) is reached, the node is designated as an LPU. The LPU may also be referred to as a PU. According to the embodiments, the LPU may be split again according to a PU tree structure, and a range in which the PU is generated by splitting the LPU is called a PU split range. A PU generated by splitting the LPU may be referred to as a sub PU. The PU split range may be set according to the distribution of the point cloud data as described above. In addition, the splitting of the LPU may be performed or skipped according to the cost. For example, nodes having data among the nodes corresponding to the LPU are recursively split into 8 child nodes according to the octree splitting method. When the LPU is split, the child nodes correspond to the sub PUs expressed as LPU/2 according to the split of the LPU.

When the size of the PU is determined, the point cloud data processing device (e.g., the point cloud transmission device described with reference to FIGS. 1 to 14, the point cloud reception device, etc.) according to the embodiments performs inter prediction according to the PU and MV information to secure a predicted value of a point within the split range.

Figure 16:
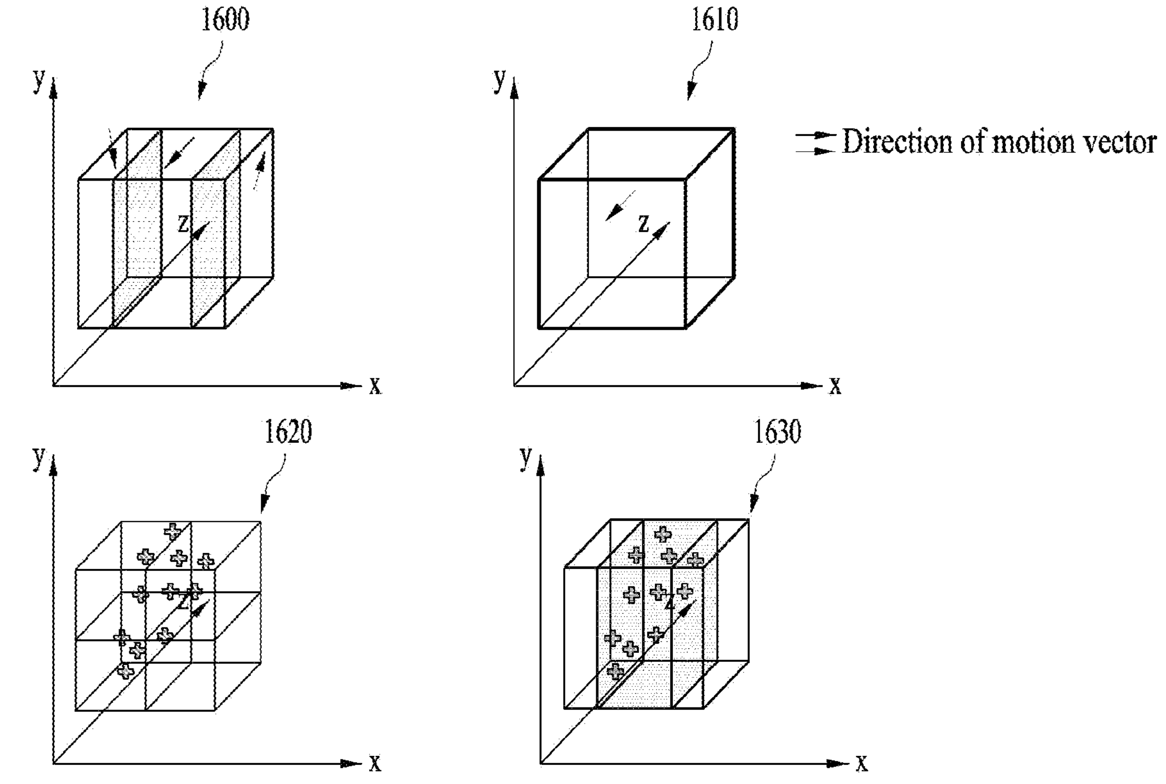
FIG. 16 illustrates an example of a PU.

FIG. 16 illustrates an example of a PU.

The upper left part of the figure shows three motion vectors having an optimized prediction direction in the PU (1600). The upper right part of the figure shows a result of predicting one motion vector by performing motion estimation at a node level corresponding to the PU level (1610).

The lower left part of the figure shows an example of splitting the PU on which motion estimation has been performed into 8 sub PUs as in the existing octree splitting (1620). In this case, unnecessary regions are not excluded, and accordingly an operation of determining whether to further split the PU is further required, which may lower coding efficiency. The lower right part of the figure shows an example of splitting the PU region into three sub PUs (1630). In this case, unnecessary regions are excluded, and accordingly coding efficiency is increased.

Figure 17:
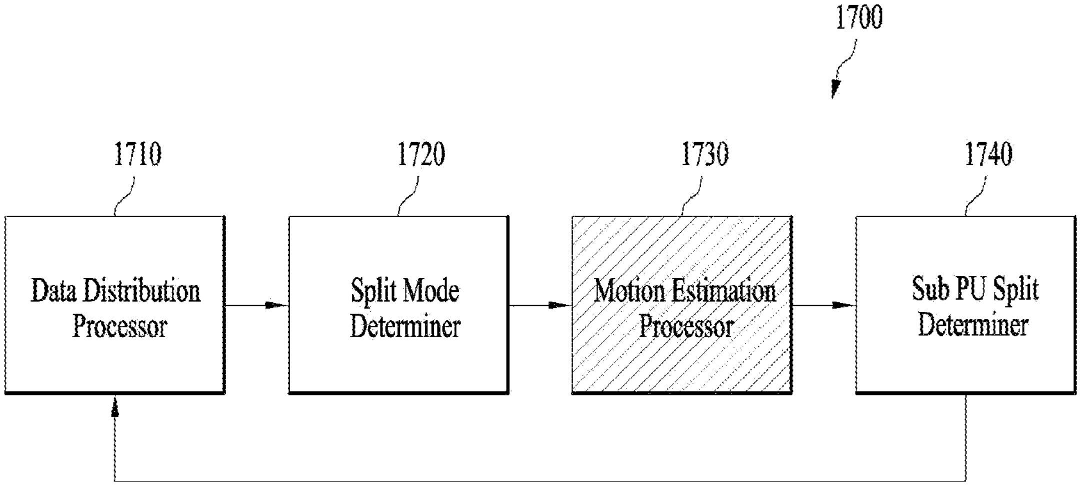
FIG. 17 illustrates an example of a PU determiner according to embodiments.

FIG. 17 illustrates an example of a PU determiner according to embodiment.

The PU determiner 1700 illustrated in FIG. 17 is included in the point cloud transmission device or the point cloud encoder described with reference to FIGS. 1 to 14, and performs PU determination and splitting described with reference to FIGS. 15 to 16. Also, the PU determiner 1700 shown in FIG. 17 may be included in the geometry encoder. The geometry encoder is included in the point cloud encoder.

The geometry encoder according to the embodiments may include at least one of the coordinate transformer 40000, the quantizer 40001, the octree analyzer 40002, the surface approximation analyzer 40003, the arithmetic encoder 40004, and the geometry reconstructor 40005 described with reference to FIG. 4. The geometry encoder according to the embodiments may include at least one of the data input unit 12000, the quantization processor 12001, the voxelization processor 12002, the octree occupancy code generator 12003, and the surface model processor 12004, the intra/inter-coding processor 12005, and the arithmetic coder 12006 described with reference to FIG. 12. Although not shown in the figures, the geometry encoder may be implemented by hardware including one or more processors or integrated circuits configured to communicate with one or more memories included in the point cloud providing device, software, firmware, or a combination thereof.

The PU determiner 1700 may include a data distribution processor 1710, a split mode determiner 1720, a motion estimation processor 1730, and a sub PU split determiner 1740. In FIG. 17 illustrating an example of the PU determiner 1700, the order of arrangement of the components may be changed, and the PU determiner 1700 may correspond to hardware, software, a process, or a combination thereof.

The data distribution processor 1710 may check (or scan) the distribution area (or range of distribution) of points constituting an entire stream or frame (e.g., random access point/intra prediction/reference frame, etc.). For example, when point cloud data is widely or narrowly distributed along a specific axis of the 3D coordinate system, it may be efficient to perform PU splitting based on the axis.

One node or one frame described with reference to FIGS. 15 and 16 is split into PUs and used for inter prediction. When the entire frame is split into PUs and motion estimation is performed, the data distribution processor 1710 may calculate a length to determine the data distribution range for each axis of the input point cloud content.

Alternatively, a value by which the distribution state and degree of data distribution may be determined, such as standard deviation, mean, min, max, medium, or mode value, may be used. However, the values are not limited to these examples.

For example, in determining the bounding box, the data distribution processor 1710 may calculate a length (which may be called a range) for determining the data distribution with respect to each axis, based on the min and max values for each axis extracted after scanning all points. The length along each axis is expressed as:

$$X\_length = X\max - X\min;$$

$$Y\_length = Y\max - Y\min;$$

$$Z\_length = Z\max - Z\min.$$

Here, X_length denotes the length along the x-axis, Y_length denotes the length along the y-axis, and Z_length denotes the length along the z-axis. The length along each axis may be secured through content scanning, or may be signaled to the point cloud decoder (or the point cloud data reception device) by the bitstream described with reference to FIGS. 1 to 14.

The data distribution processor 1710 may compare the lengths along the respective axes to determine an axis that may form the basis for splitting. When the axis that is the basis for splitting is determined, the remaining axes that are not the basis maintain the values corresponding to the size of the original node or bounding box. When the lengths along two axes are equal and the length along the other axis is less than those of the two axes, PU splitting is performed based on the two axes at the same time, and the remaining axis maintains the value corresponding to the original node or bounding box size. When the lengths along the three axes or the two axes are less than a preset threshold value, the three axes or the two axes may be split by the same method/reference/mode or the splitting may be skipped.

The split mode determiner 1720 according to the embodiments determines the shape of the PU. The shape of the PU may be determined according to a split mode. In other words, the PU has a shape of a cube, a cuboid, or the like according to the split mode. The split mode determiner 1720 calculates a residual between the reference frame/intra prediction frame and the current frame when the PU is split, finds a split mode with the smallest residual, and determines the mode as the split mode. The determined split mode and residual are transmitted to the motion estimation processor 1730.

According to the embodiments, there are five split modes called Mode 0 to Mode 4. The number and names of the split modes are not limited to this example.

Mode 0: Indicates that the splitting is skipped. This mode is applied when there is no difference in length between the three axes described above or the length do not exceed a preset threshold value. However, Mode 0 is not limited to this example and may be applied in other situations. Accordingly, the box shown in the figure represents one PU. Mode 0 represents a method of finding an MV by setting a searching range without splitting the PU, and the corresponding information (e.g., Mode0 information, etc.) is delivered to the point cloud encoder and the point cloud decoder. When PU splitting is recursively applied, Mode 0 may be applied to a sub PU that is generated from the PU in a split mode (e.g., Mode 1) other than Mode 0.

Mode 1: Indicates 1:1 splitting. The expression X:Y represents a relative difference (or ratio) between the size (or dimensions) of a sub PU close to the origin of the splitting reference axis and the size (or dimensions) of a sub PU close to the origin of the splitting reference axis. According to embodiments, X corresponds to the size of a sub PU close to the origin of the splitting reference axis, and Y corresponds to the size of a sub PU far from the origin of the splitting reference axis. In the case of Mode 1, the difference in size between a sub PU close to the origin (referred to as, for example, a first sub PU) and a sub PU far from the origin (referred to as, for example, a second sub PU) is 1:1, and thus the first PU and the second sub PU have the same size. Mode 1 is applied when there is no difference in length between the two axes or the lengths do not exceed a preset threshold value. However, Mode 1 is not limited to this example and may be applied in other situations as well. A PU is split into halves (½) based on one axis, and each sub PU generated by the splitting is configured as a searching range to find an MV, and then motion compensation is performed. Thereafter, the generated residual value and the split mode value are delivered to the point cloud encoder and the point cloud decoder. The sub PUs split according to the embodiments may have different MVs. Also, each sub PU may be further split or splitting thereof may be skipped according to a different condition or split mode. The MVs may be defined for each PU or may have the same vector information.

Mode 2: Indicates 1:3 splitting. Since the difference in size between a sub PU close to the origin (referred to as, for example, a first sub PU) and a sub PU far from the origin (referred to as, for example, a second sub PU) is 1:3, the second sub PU is larger than the first sub PU. Mode 2 is applied when the length or range along a specific axis is greater or less than the those along the other two axes. However, Mode 2 is not limited to this example and may be applied in other situations. Two sub PUs generated by splitting may have different MVs, may be further split under different conditions or modes, or the splitting thereof may be skipped. The MVs may be defined for each sub PU or may have the same vector information.

Mode 3: Indicates 3:1 splitting. Since the difference in size between a sub PU close to the origin (referred to as, for example, a first sub PU) and a sub PU far from the origin (referred to as, for example, a second sub PU) is 3:1, the second sub PU is smaller than the first sub PU. Mode 3 is applied when the length or range along a specific axis is greater or less than the those along the other two axes. However, Mode 3 is not limited to this example and may be applied in other situations. Two sub PUs generated by splitting may have different MVs, may be further split under different conditions or modes. The MVs may be defined for each sub PU or may have the same vector information.

Mode 2 and Mode 3 are selected according to the data distribution.

Mode 4: 1:2:1 split, indicating that a PU is split into three sub PUs. Since the difference in size between a first sub PU close to the origin, a second sub PU positioned in the center, and a third sub PU farthest from the origin is 1:2:1, the second sub PU is relatively larger than the first sub PU and the third sub PU. Mode 4 may be determined by a split cost and is used when the sub PUs have significantly different MVs. However, Mode 4 is not limited to this example and may be applied in other situations. The three sub PUs generated by the splitting may have different MVs, may be further split under different conditions or modes, or the splitting thereof may be skipped.

The motion estimation processor 1730 according to the embodiments performs motion estimation (or motion vector estimation). The MVs extracted according to the motion estimation, and a cost value for determining additional splitting and/or skip are delivered to the sub PU split determiner 1740.

The sub PU split determiner 1740 checks a cost caused by application of the MVs extracted according to the motion estimation, and determines whether to perform additional splitting into sub PUs or skip the splitting according to the cost. The sub PU split determiner 1740 delivers the corresponding information to the data distribution processor 1710 when additional splitting is performed. The data distribution processor 1710 recursively performs an operation for splitting again. In a case of splitting according to the cost calculation, when splitting is performed based on the remaining axes except for the axis used as the basis of splitting in the previous step without considering data distribution belonging to each sub PU component, the operation of the data distribution processor 1710 is skipped and information related to the additional splitting is delivered to the split mode determiner 1720. The split mode determiner 1720 recursively performs the operation for splitting again.

Figure 18:
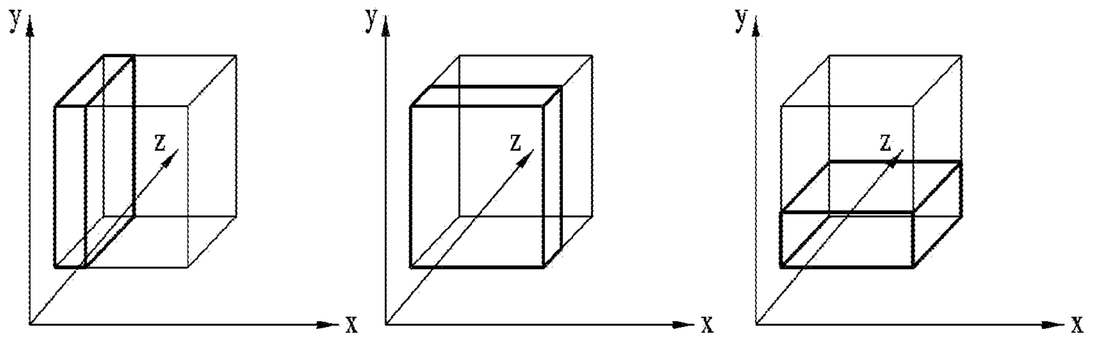
FIG. 18 illustrates an example of PU splitting according to embodiments.

FIG. 18 illustrates an example of PU splitting according to embodiments.

FIG. 18 illustrates an example of PU splitting along each axis. The left part of the figure shows a PU that is split according to Mode 2 described with reference to FIG. 17 based on the x-axis for the remaining axes. The middle part of the figure shows a PU that is split according to Mode 2 described with reference to FIG. 17 based on the z-axis for the remaining axes. The right part of the figure shows a PU that is split according to Mode 2 with reference to FIG. 17 based on the y-axis for the remaining axes. As described above, according to the splitting, each PU is split into two sub PUs, and the difference in size between the two sub PUs is represented as 1:3.

Figure 19:
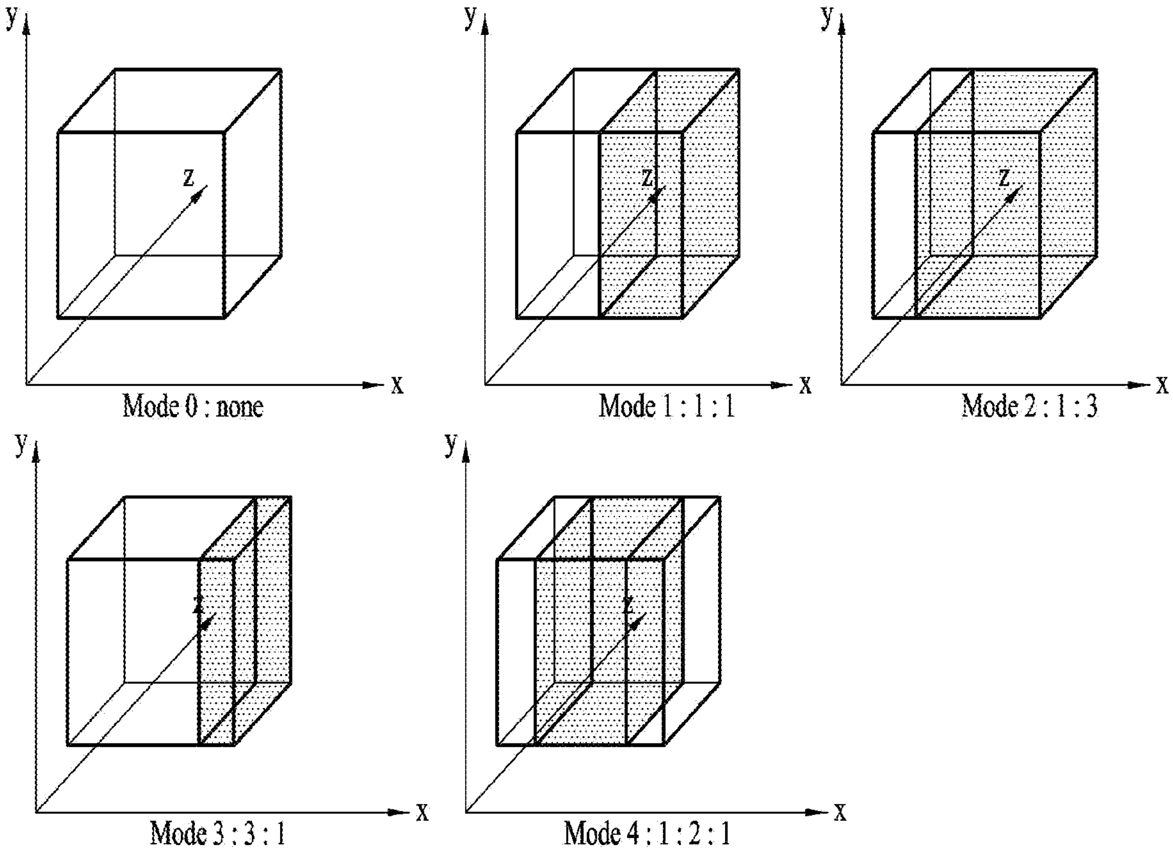
FIG. 19 illustrates an example of PU splitting according to embodiments.

FIG. 19 illustrates an example of PU splitting according to embodiments.

FIG. 19 sequentially shows examples of PU splitting performed by applying Mode 0 to Mode 4 described with reference to FIG. 17 based on the x-axis. Descriptions of Mode 0, Mode 1, Mode 2, Mode 3, and Mode 4 are the same as those of FIGS. 17 to 18 and thus will be skipped.

Figure 20:
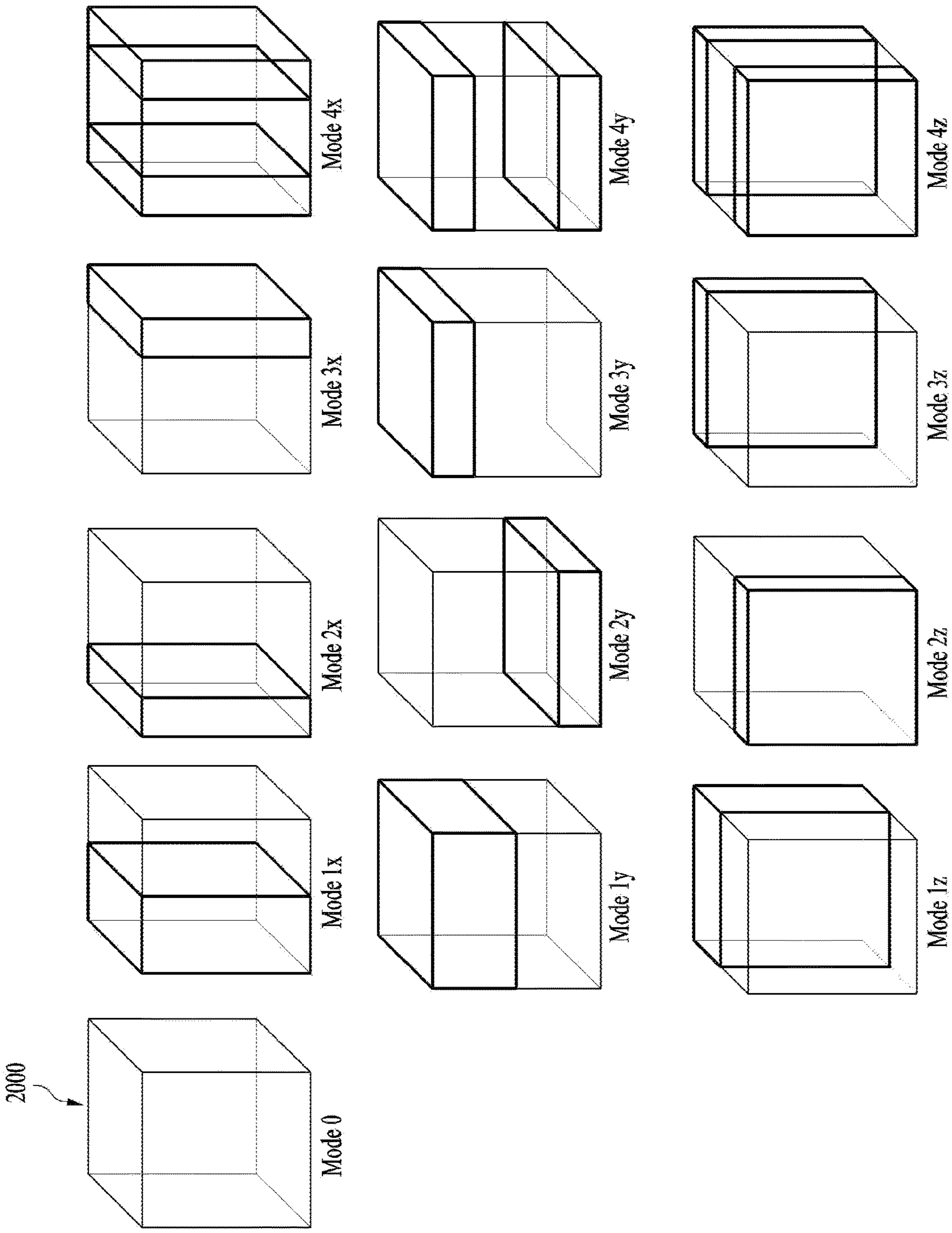
FIG. 20 illustrates an example of PU splitting according to embodiments.

FIG. 20 illustrates an example of PU splitting according to embodiments.

FIG. 20 illustrates an example of the PU 2000 corresponding to Mode 0 and examples in which Mode 1, Mode 2, Mode 3, and Mode 4 described with reference to FIG. 17 are applied for each of the x-axis, y-axis, and z-axis. Mode 1, Mode 2, Mode 3, and Mode 4 applied based on the x-axis are represented as Mode 1x, Mode 2x, Mode 3x, and Mode 4x, respectively. Mode 1, Mode 2, Mode 3, and Mode 4 applied based on the y-axis are represented as Mode 1 y, Mode 2y, Mode 3y, and Mode 4y, respectively. Mode 1, Mode 2, Mode 3, and Mode 4 applied based on the z-axis are represented as Mode 1z, Mode 2z, Mode 3z, and Mode 4z, respectively. For the two or three split sub PUs, each sub PU may be split according to any one of Mode 1, Mode 2, Mode 3, and Mode 4.

Figure 21:
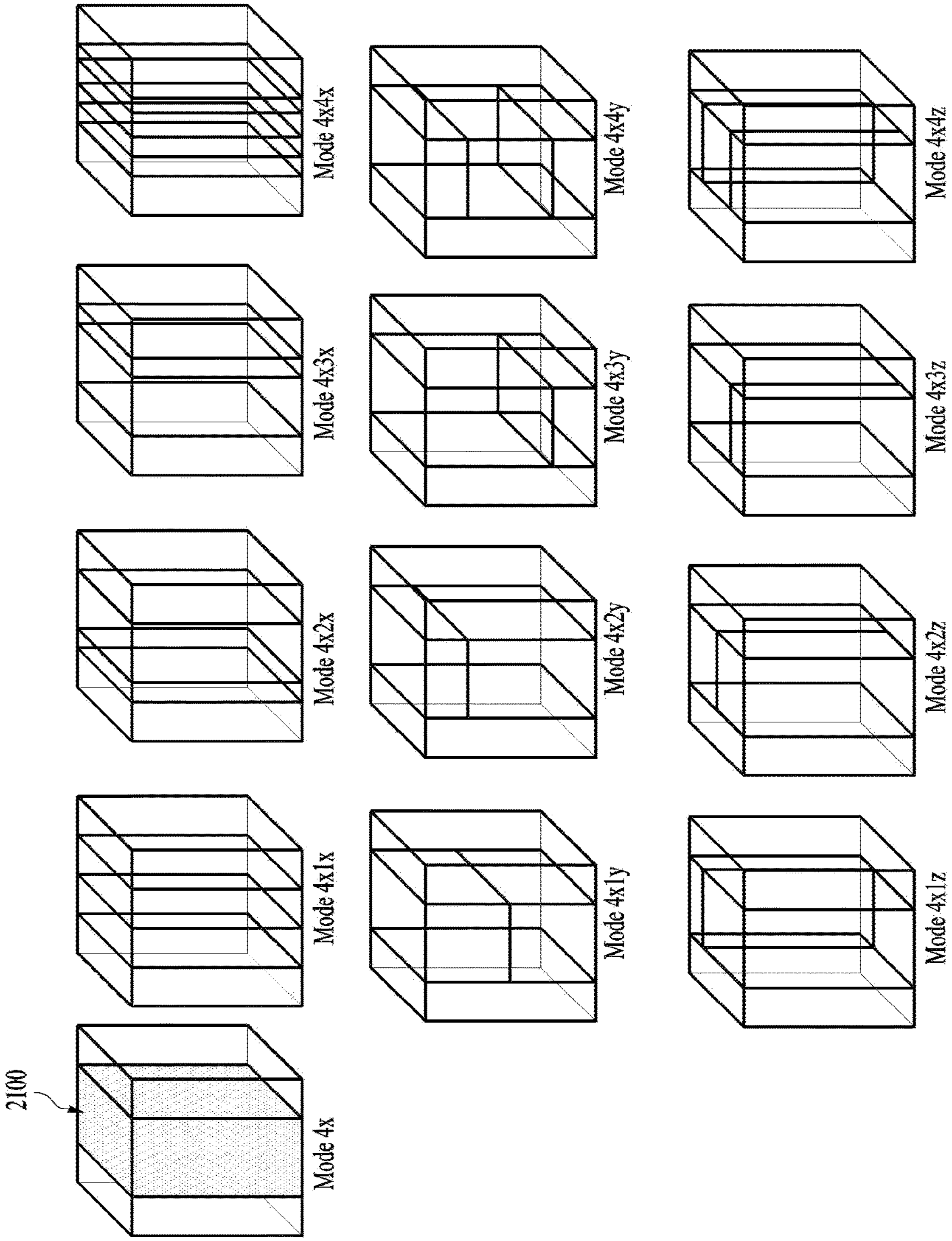
FIG. 21 illustrates an example of PU splitting according to embodiments.

FIG. 21 illustrates an example of PU splitting according to embodiments.

FIG. 21 illustrates 16 splitting examples in which Mode 1, Mode 2, Mode 3, and Mode 4 described with reference to FIG. 17 are applied, with respect to each of the x-axis, y-axis, and z-axis, to a sub PU 2100 positioned in the middle among the three sub PUs split according to Mode 4 (Mode 4x) based on the x-axis described with reference to FIG. 20. Mode 1, Mode 2, Mode 3, and Mode 4 applied based on the x-axis are represented as Mode 4x1x, Mode 4x2x, Mode 4x3x, and Mode 4x4x, respectively. Mode 1, Mode 2, Mode 3, and Mode 4 applied based on the y-axis are represented as Mode 4x1y, Mode4x2y, Mode 4x3y, and Mode 4x4y, respectively. Mode 1, Mode 2, Mode 3, and Mode 4 applied based on the z-axis are represented as Mode 4x1z, Mode 4x2z, Mode 4x3z, and Mode 4x4z, respectively.

As shown in the figure, when additional splitting is applied, the axis serving as a reference may be the reference (e.g., the x axis) according to the previous splitting or may be another axis. The axis serving as a basis for applying the additional splitting may be determined by checking and comparing the data distributions for the respective sub PUs or the lengths and/or ranges of the data, or may be preset before PU splitting. Information about the preset axis is signaled to the point cloud encoder described with reference to FIGS. 1 to 14 or signaled to the point cloud decoder through the bitstream described with reference to FIGS. 1 to 14.

Figure 22:
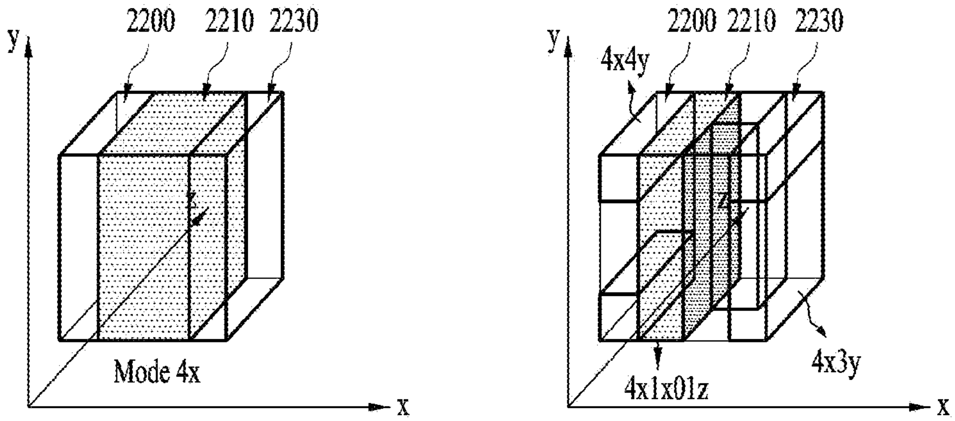
FIG. 22 illustrates an example of PU splitting according to embodiments.

FIG. 22 illustrates an example of PU splitting according to embodiments.

The left part of FIG. 22 shows three sub PUs, a first sub PU 2200, a second sub PU 2210, and a third sub PU 2230 which are split according to Mode 4 (Mode 4x) applied based on the x-axis described with reference to FIG. 20. The right part of the figure shows an example in which the first sub PU 2200, the second sub PU 2210, and the third sub PU 2230 are each further split. As shown in the figure, the first sub PU 2200 may be split according to Mode 4 based on the y-axis. Accordingly, the split mode of the first sub PU 2200 is represented as 4x4y (or Mode4x4y). The second sub PU 2210 is split according to Mode 1. Then, the first sub PU may not be split, and the second sub PU may be split according to Mode 1 based on the z-axis. Therefore, the final split mode of the second sub PU 2201 is represented as 4x1x01z (or Mode 4x1x01). The third Sub PU 2230 may be split according to Mode 3 based on the y-axis. Therefore, the final split mode of the third sub PU 2230 is represented as 4x3y (or Mode 4x3y). As shown in the figure, after PU splitting, each sub PU may be split according to the same or different split mode, and thus the shapes of the sub PUs of each sub PU may be different. This splitting configuration may be easily applied to segmentation of point cloud data. FIG. 22 is an example, and PUs having various shapes and sizes may be applied by combining the various split modes described with reference to FIGS. 17 to 21.

Figure 23:
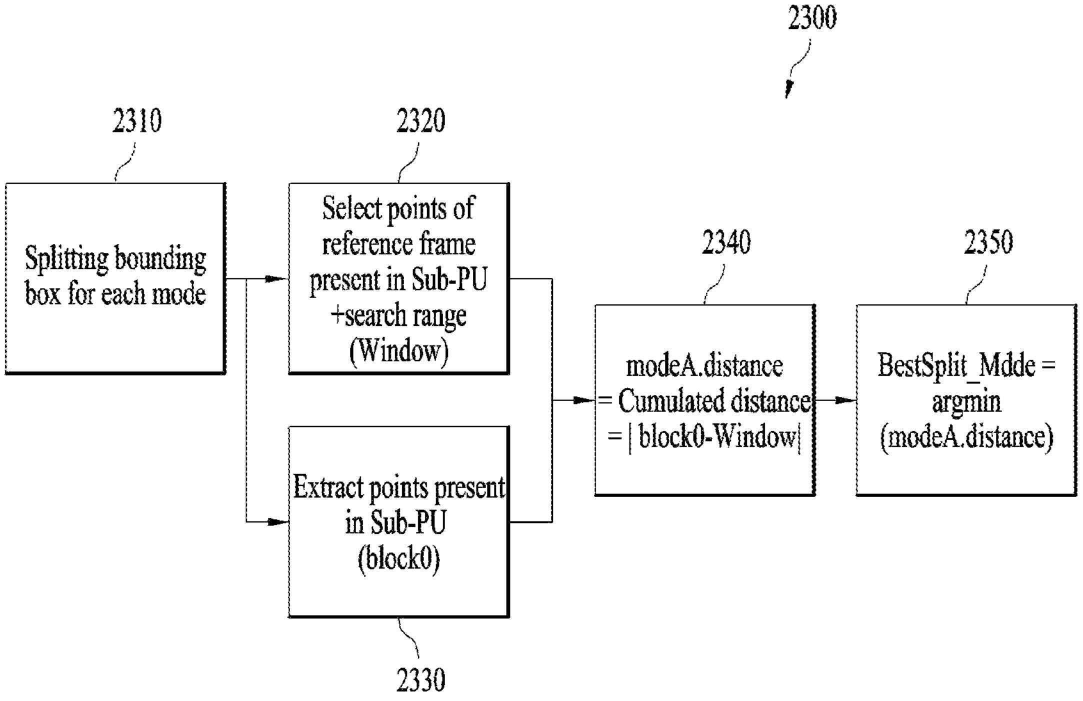
FIG. 23 illustrates an example of a split mode determination method.

FIG. 23 illustrates an example of a split mode determination method.

As described above, the PU may be split in various directions and shapes. The point cloud transmission device and the reception device according to the embodiments perform a process for determining a split mode in order to determine the best mode (or best split mode). As described above, the split mode determiner according to the embodiments may perform PU spitting for a specific node in a frame or octree structure. FIG. 23 is a flowchart 2300 illustrating a method of determining a split mode by a split mode determiner (e.g., the split mode determiner 1720 described with reference to FIG. 17) for a bounding box corresponding to one frame.

The split mode determiner according to the embodiments may split the bounding box for each mode (2310). The split mode determiner selects points corresponding to a window (2320) and extracts points (block) present in a sub PU (2330). The window according to the embodiments represents a region including the sub PU and search range (or node or frame) of a region at the same position in the reference frame. The block according to the embodiments represents a sub PU of a PU in a region (or node, frame) that is a target of the PU in the current frame. The sub PU according to the embodiments represents each element constituting a PU that is split in any split mode. Each PU and sub PU are configured not to overlap each other within the same frame. Since the window includes a search range, it may overlap with another window within the same reference frame. The window according to the embodiments is configured by adding the search range to a region at the same position as the sub PU in order to include a region in which the sub PU may be shifted. The search range may be signaled to the point cloud decoder as preconfigured information by a bitstream, or may be adaptively changed according to the size of the PU.

The split mode determiner according to the embodiments may calculate a cumulated distance between the block and the window for cost calculation for each mode (2340). The distance calculated for each mode is represented as mode A.distance.

The split mode determiner may calculate the cumulated distance for each mode as a value of rate distortion optimization (RDO), and then determine the mode having the lowest cost as the best mode (represented as BestSplit_Mode) (2350).

The following equation represents a method of determining the best mode.

$$Mode_X.\text{distance} = \sum_k^{numBlock} \sum_l^{Block\_size} \sum_m^{window\_size} |block_k.x_l - window_k.x_m| + |block_k.y_l - window_m.y_m| + |block_k.z_l - window.z_m|$$

-continued $$BestMode = \underset{X}{\text{argmin}}(RDCost_{ModeX})$$

$$RDCost_{Mode} = Mode_X.\text{distance} + \lambda \times R$$

In the equation, X denotes the mode value (e.g., 0, 1, . . . ), and numBlock denotes the number of blocks constituting modeX. Block_size denotes the total number of points included in a block, and window_size denotes the total number of points included in a window. Also, blockk.$x_l$, block.$y_l$, and block.$z_l$ denote the x, y, z coordinate information related to the 1-th point included in the block, and window.$x_m$, window.$y_m$, and window.$z_m$ denote the x, y, z coordinate information related to the m-th point included in the window. $Mode_X$ denotes information corresponding to Modes 0 to 4, λ denotes the Lagrange multiplier, and R denotes the number of bits used to split the mode.

Figure 24:
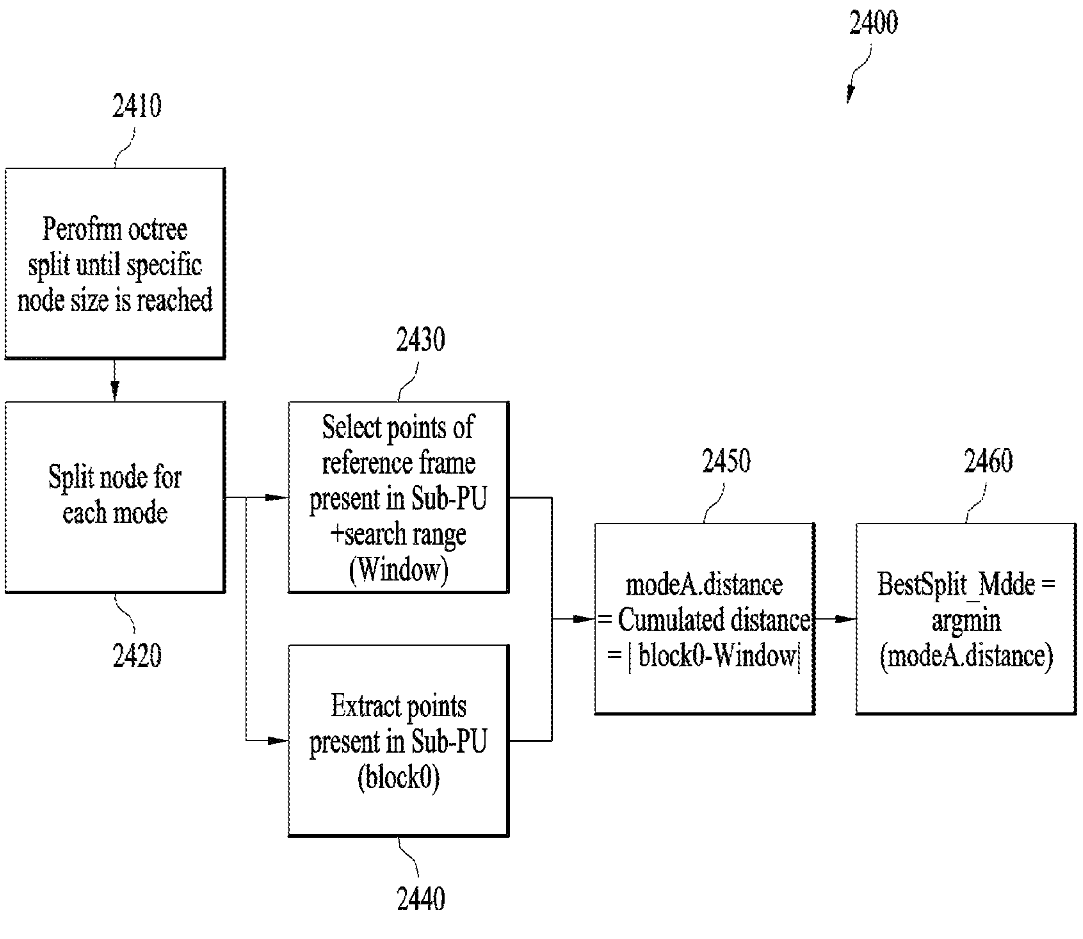
FIG. 24 illustrates an example of a split mode determination method.

FIG. 24 illustrates an example of a method of determining a split mode.

FIG. 24, shows another example of FIG. 23, is a flowchart 2400 illustrating a method of determining a split mode by a split mode determiner (e.g., the split mode determiner 1720 described with reference to FIG. 17) for applying PU splitting from a specific node size.

When the octree splitting is performed until a specific node size is reached (2410), the split mode determiner according to the embodiments may split the 3D box corresponding to the specific node for each mode (2420). The split mode determiner selects points corresponding to a window (2430) and extracts points (block) present in a sub PU (2440). The windows and blocks according to the embodiments are the same as those described with reference to FIG. 23 and thus a description thereof will be skipped.

The split mode determiner according to embodiments may calculate a cumulated distance between the block and the window for cost calculation for each mode (2450). The distance calculated for each mode is represented as mode A.distance.

split mode determiner may calculate the cumulated distance for each mode as a value of rate distortion optimization (RDO), and then determine the mode having the lowest cost as the best mode (BestSplit_Mode) (2460). The method of determining the best mode is the same as that described with reference to FIG. 24, and thus a detailed description thereof will be skipped.

Figure 25:
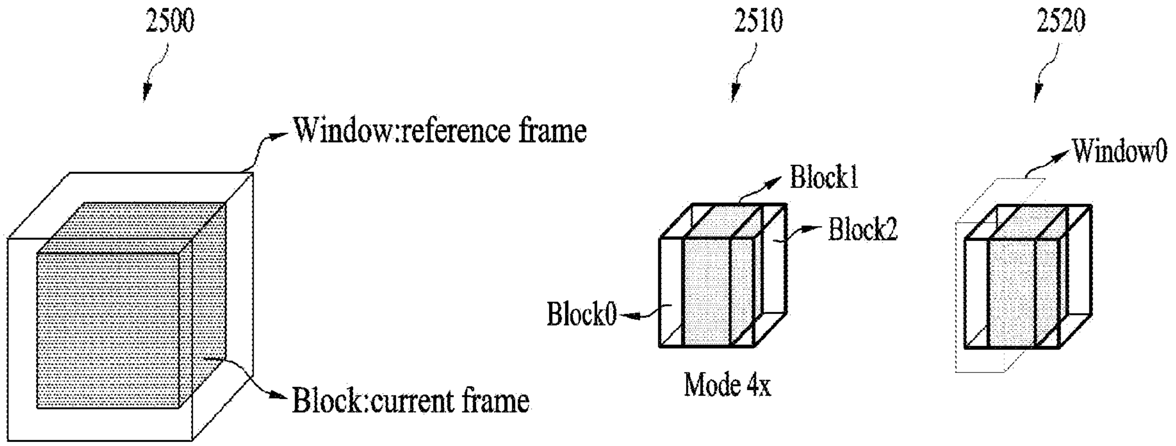
FIG. 25 shows an example of a window and a block.

FIG. 25 shows an example of a window and a block.

The left part of FIG. 25 is an example 2500 illustrating a relationship between a window and a block.

The window according to the embodiments represents a region including the sub PU and search range (or node or frame) of a region at the same position in the reference frame. The block according to the embodiments represents a sub PU of a PU in a region (or node, frame) that is a target of the PU in the current frame. The sub PU according to the embodiments represents each element constituting a PU that is split in any split mode. Thus, a window may include blocks.

The example 2510 in the middle of FIG. 25 shows three sub PUs generated by splitting a PU according to Mode 4 based on the x-axis in order for the split mode determiner to calculate the cost for each mode as described with reference to FIGS. 23 and 24. The sub PUs are blocks, and are represented as block 0, block 1, and block 2, respectively. Window 0, window 1, and window 2, which are windows of each block 0, block 1, and block 2, are determined.

Window 0, window 1, and window 2 are regions obtained by adding a search range to the regions of Block0, Block1, and Block2, respectively, and the points of the reference frame positioned in the regions are included.

An example 2520 on the right side of FIG. 25 shows window 0, which is a window of block 0. As shown in the figure, the region of window 0 is larger than the region of block 0. As described above, the split mode determiner may calculate distances between all points included in the two regions of window 0 and block 0 according to Mode 4.

The point cloud data processing device (e.g., the transmission device described with reference to FIGS. 1, 12 and 14) may transmit the encoded point cloud data in the form of a bitstream. The bitstream is a sequence of bits that forms a representation of the point cloud data (or point cloud frame).

The point cloud data (or point cloud frame) may be partitioned into tiles and slices.

The point cloud data may be partitioned into multiple slices, and is encoded in a bitstream. One slice is a set of points and is expressed as a series of syntax elements representing all or part of the encoded point cloud data. A slice may or may not have dependencies on other slices. In addition, a slice includes one geometry data unit, and may have zero or one or more attribute data units. As described above, since attribute encoding is performed based on geometry encoding, the attribute data units are based on geometry data units in the same slice. That is, the point cloud data reception device (e.g., the reception device 10004 or the point cloud video decoder 10006) may process attribute data based on the decoded geometry data. Accordingly, in a slice, a geometry data unit must precede the associated attribute data units. The data units in the slice are necessarily contiguous, and the order of the slices is not specified.

A tile is a (three-dimensional) cuboid in a bounding box (e.g., the bounding box described with reference to FIG. 5). The bounding box may include one or more tiles. A tile may fully or partially overlap another tile. One tile may include one or more slices.

Accordingly, the point cloud data transmission device may provide high-quality point cloud content by processing data corresponding to a tile according to the importance. That is, the point cloud data transmission device may perform point cloud compression coding with better compression efficiency and appropriate latency on data corresponding to an area important to a user.

The bitstream according to the embodiments contains signaling information and a plurality of slices (slice 0, . . . , slice n). As shown in the figure, the signaling information precedes the slices in the bitstream. Accordingly, the point cloud data reception device may first secure the signaling information and sequentially or selectively process the plurality of slices based on the signaling information. As shown in the figure, slice0 includes one geometry data unit $Geom0^0$ and two attribute data units $Attr0^0$ and $Attr1^0$. Also, the geometry data unit precedes the attribute data units in the same slice. Accordingly, the point cloud data reception device processes (decodes) the geometry data unit (or geometry data), and then processes the attribute data units (or attribute data) based on the processed geometry data. The signaling information according to the embodiments may be referred to as signaling data, metadata, or the like, but is not limited thereto.

According to embodiments, the signaling information includes a sequence parameter set (SPS), a geometry parameter set (GPS), and one or more attribute parameter sets (APSs). The SPS is encoding information about the entire sequence, such as a profile or a level, and may include comprehensive information (sequence level) about the entire sequence, such as a picture resolution and a video format. The GPS is information about geometry encoding applied to geometry included in the sequence (bitstream). The GPS may include information about an octree (e.g., the octree described with reference to FIG. 6) and information about an octree depth. The APS is information about attribute encoding applied to an attribute included in the sequence (bitstream). As shown in the figure, the bitstream contains one or more APSs (e.g., APS0, APS1, . . . in the figure) according to an identifier for identifying the attribute.

The signaling information according to embodiments may further include information about a tile (e.g., tile inventory, a tile parameter set). The information about the tile may include information about a tile identifier, a tile size, and the like. According to embodiments, the signaling information is applied to a corresponding bitstream as information about a sequence, that is, a bitstream level. In addition, the signaling information has a syntax structure including a syntax element and a descriptor describing the same. A pseudo code may be used to describe the syntax. In addition, the point cloud reception device (e.g., the reception device 10004 of FIG. 1, the point cloud decoder of FIGS. 10 and 11, or the reception device of FIG. 13) may sequentially parse and process the syntax elements in the syntax.

Although not shown in the figure, the geometry data unit and the attribute data unit include a geometry header and an attribute header, respectively. The geometry header and the attribute header have the above-described syntax structure as signaling information applied at the slice level.

The geometry header includes information (or signaling information) for processing a corresponding geometry data unit. Therefore, the geometry header appears first in the geometry data unit. The point cloud reception device may process the geometry data unit by first parsing the geometry header. The geometry header has an association with the GPS, which contains information about the entire geometry. Accordingly, the geometry header contains information specifying gps_geom_parameter_set_id included in the GPS. In addition, the geometry header contains tile information (e.g., tile_id), a tile identifier, and the like related to a slice to which the geometry data unit belongs.

The attribute header contains information (or signaling information) for processing a corresponding attribute data unit. Accordingly, the attribute header appears first in the attribute data unit. The point cloud reception device may process the attribute data unit by parsing the attribute header first. The attribute header has an association with the APS, which contains information about all attributes. Accordingly, the attribute header contains information specifying aps_attr_parameter_set_id included in the APS. As described above, attribute decoding is based on geometry decoding. Accordingly, the attribute header contains information specifying a slice identifier contained in the geometry header in order to determine a geometry data unit associated with the attribute data unit.

When the point cloud transmission device performs PU splitting described with reference to FIGS. 15 to 25, signaling information in the bitstream may further include signaling information related to the PU splitting (e.g., information about whether to apply the inter prediction, the split mode, and the split mode determination method as described above). Signaling information related to projection according to embodiments may be included in sequence-level signaling information (e.g., SPS, APS, etc.), a slice level (e.g., an attribute header, etc.), an SEI message, or the like.

The point cloud reception device according to the embodiments may perform decoding including reverse projection based on the signaling information related to PU splitting.

The signaling information related to PU splitting according to the embodiments may be included in signaling information of various levels (e.g., a sequence level, a slice level, etc.). The signaling information related to PU splitting is transmitted to the point cloud reception device (e.g., the reception device 10004 of FIG. 1, the point cloud decoder of FIGS. 10 and 11, or the reception device of FIG. 13).

FIG. 26 shows an example of a syntax structure of signaling information related to PU splitting.

FIG. 26 shows an example of a syntax structure of an SPS in which signaling information related to PU splitting is included at the sequence level.

pu_coding_flag: Indicates whether inter prediction is performed in a PU. When the value of pu_coding_flag is TRUE, it indicates that inter prediction is performed in the PU. When the value is FALSE, it indicates that inter prediction is not performed in the PU.

frame_pu_split_flag: Indicates whether inter prediction is performed by splitting the entire frame into PUs. When the value of frame_pu_split_flag is TRUE, the entire frame is split into Pus. When the value is FALSE, PU splitting is performed at the slice level or a specific octree level.

split_pu_initial_criteria: Indicates which of the three axes first serves as a reference for the splitting. The axes serving as the reference according to specific values are shown in the table below.

TABLE 1

| split_pu_initial_criteria | Description |
|---|---|
| 0 | Width |
| 1 | Height |
| 2 | Depth |
| 3-7 | Reserved |

In the table, the left column shows the values of split_pu_initial_criteria, and the right column shows the reference axis (or the width, height, or depth of the bounding box corresponding to the entire frame or the bounding box corresponding to a specific octree level) according to the value of split_pu_initial_criteria. According to embodiments, the values of split_pu_initial_criteria are changeable.

split_pu_criteria_update_flag: Indicates whether an axis serving as a reference for additional splitting (splitting of the next level) is newly searched for. When the value of split_pu_criteria_update_flag is TRUE, a new axis for the criterion of additional splitting is searched for. When the value is FALSE, the current reference axis is continuously used.

split_pu_threshold: In determining a new reference axis when searching for a reference axis or performing additional splitting, when the difference in length of one or more reference axes is less than a threshold, splitting is performed using the same method, or splitting is performed with respect to the remaining axes. The corresponding value is predefined.

initial_split_mode: Indicates a PU split type or mode. The modes according to the values of initial_split_mode are specified as shown in the table below.

TABLE 2

| initial_split_mode | Description |
|---|---|
| 0 | None |
| 1 | 1:1 |
| 2 | 1:3 |
| 3 | 3:1 |
| 4 | 1:2:1 |
| 5-8 | reserved |

In the table, the left column shows values of initial_split_mode, and the right column shows a ratio indicating the difference in size between sub PUs corresponding to the split mode described with reference to FIGS. 19 to 22 according to the value of initial_split_mode. For example, initial_split_ mode equal to 0 may indicate the split mode according to Mode 0 described with reference to FIGS. 19 to 22, that is, no split. Also, initial_split_mode equal to 1 indicates 1:1 according to the split mode according to Mode 1 described with reference to FIG. 19. According to embodiments, the split mode indicated by each value of initial_split_mode may be changed, and the representations are not limited to this example.

initial_length_width, initial_length_height, initial_length_depth: Variables indicating distribution of the entire data in each axial frame of the PU splitting, representing the length, data distribution, or range.

initial_length_width indicates the range of data distributed in the width direction (max−min), initial_length_height indicates the range of data distributed in the height direction (max−min), and initial_length_depth indicates the range of data distributed in the depth direction. The values may be replaced with any values that may be used to calculate and compare the data distribution.

split_pu_max_node_size: Indicates the size of the largest PU when PU splitting is performed in a slice unit or at a specific level (or node corresponding to the level) in the octree structure.

max_split_pu_level: Indicates the maximum number of PU splits. The value of max_split_pu_level may be adaptively changed according to the total number of points, or may be pre-input and predetermined.

The SPS syntax according to embodiments is not limited to the above example, and may further include additional elements or may exclude some of the elements shown in the figure for efficiency of signaling. Some of the elements may be signaled through signaling information (e.g., APS, attribute header, etc.) or an attribute data unit other than the SPS.

FIG. 27 shows an example of a syntax structure of signaling information related to PU splitting.

FIG. 27 shows an example of a syntax structure of a tile parameter set in which signaling information related to PU splitting is included at a tile level. The signaling information related to PU splitting is the same as that described with reference to FIG. 26, and thus a description thereof will be skipped. The syntax of the tile parameter set according to the embodiments is not limited to the above example. The syntax may further include additional elements or may not include some of the elements shown in the figure for efficiency of signaling. Some of the elements may be signaled through signaling information (e.g., APS, attribute header, etc.) or an attribute data unit other than the tile parameter set.

FIG. 28 shows an example of a syntax structure of signaling information related to PU splitting.

FIG. 28 shows an example of a syntax structure of a GPS in which signaling information related to PU splitting is included at the sequence level. The signaling information related to PU splitting is the same as that described with reference to FIG. 26, and thus a description thereof will be skipped. The GPS syntax according to the embodiments is not limited to the above example. The syntax may further include additional elements or may not include some of the elements shown in the figure for efficiency of signaling. Some of the elements may be signaled through signaling information (e.g., APS, attribute header, etc.) or an attribute data unit other than the GPS.

FIG. 29 shows an example of a syntax structure of signaling information related to PU splitting.

FIG. 29 shows an example of a syntax structure of an APS in which signaling information related to PU splitting is included at the sequence level. The signaling information related to PU splitting is the same as that described with reference to FIG. 26, and thus a description thereof will be skipped. The GPS syntax according to the embodiments is not limited to the above example. The syntax may further include additional elements or may not include some of the elements shown in the figure for efficiency of signaling. Some of the elements may be signaled through signaling information, for example, a geometry slice data unit other than the APS.

FIG. 30 shows an example of a syntax structure of signaling information related to PU splitting.

FIG. 30 shows an example of a syntax structure of a geometry slice header in which signaling information related to PU splitting is included at the slice level. The signaling information related to PU splitting is the same as that described with reference to FIG. 26, and thus a description thereof will be skipped. The syntax of the geometry slice header according to the embodiments is not limited to the above example. The syntax may further include additional elements or may not include some of the elements shown in the figure for efficiency of signaling. Some of the elements may be signaled through signaling information, for example, a geometry slice data unit other than the geometry slice header.

FIG. 31 shows an example of a syntax structure of signaling information related to PU splitting.

FIG. 31 shows an example of a syntax structure of geometry slice data in which signaling information related to PU splitting is included at the slice level. The signaling information related to PU splitting is the same as that described with reference to FIG. 26, and thus a description thereof will be skipped. The syntax of the geometry slice data according to the embodiments is not limited to the above example. The syntax may further include additional elements or may not include some of the elements shown in the figure for efficiency of signaling. Some of the elements may be signaled through signaling information (e.g., an attribute header, etc.) or an attribute data unit other than the geometry slice data.

Figure 32:
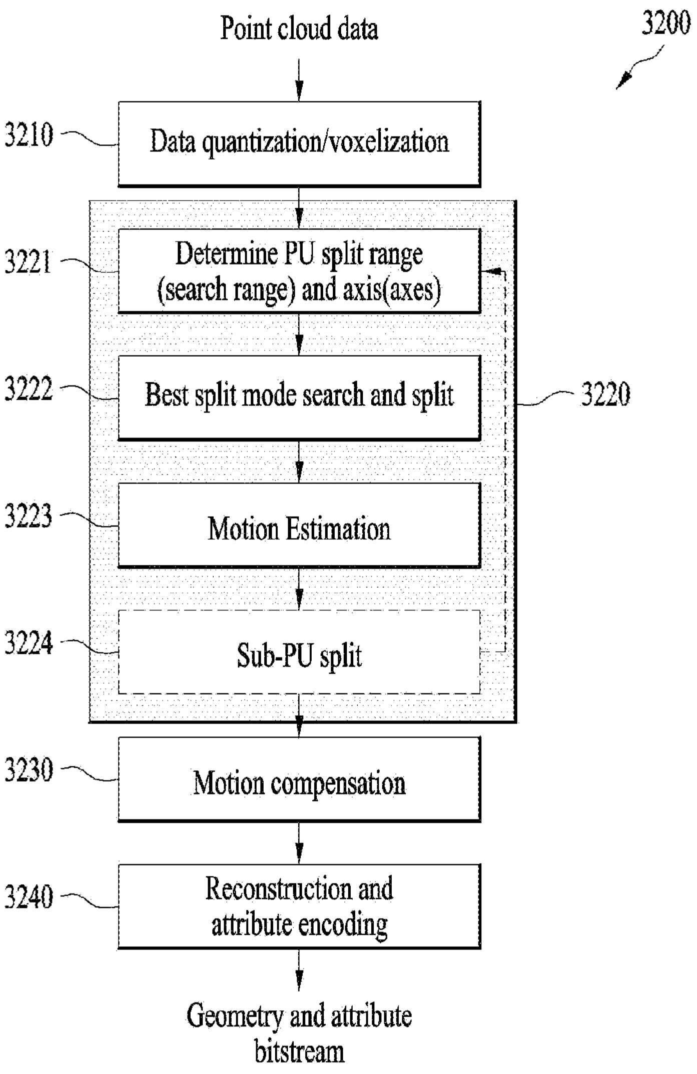
FIG. 32 is a flow diagram illustrating a point cloud processing method according to embodiments.

FIG. 32 is a flow diagram illustrating a point cloud processing method according to embodiments.

The flow diagram 3200 of FIG. 32 illustrates a processing method for a point cloud data processing device (e.g., the point cloud data transmission device, the point cloud encoder, the geometry encoder, or the like described with reference to FIGS. 1 to 14) configured to perform the PU splitting described with reference to FIGS. 15 to 31. The point cloud processing method illustrated in the figure may include the method of determining the split mode described with reference to FIGS. 17 and 24 to 25.

The point cloud data processing device (e.g., the geometry encoder) according to the embodiments receives point cloud data as an input and performs data quantization/voxelization to facilitate compression of the geometry of the input point cloud data (3210). The voxelized geometry has an octree structure.

The geometry encoder according to the embodiments may include at least one of the coordinate transformer 40000, the quantizer 40001, the octree analyzer 40002, the surface approximation analyzer 40003, the arithmetic encoder 40004, and the geometry reconstructor 40005 described with reference to FIG. 4. The geometry encoder according to the exemplary embodiments may include at least one of the data input unit 12000, the quantization processor 12001, the voxelization processor 12002, the octree occupancy code generator 12003, and the surface model processor 12004, the intra/inter-coding processor 12005, and the arithmetic coder 12006 described with reference to FIG. 12. Although not shown in the figures, the geometry encoder may be implemented by hardware including one or more processors or integrated circuits configured to communicate with one or more memories included in the point cloud providing device, software, firmware, or a combination thereof.

The point cloud data processing device (e.g., the geometry encoder) according to embodiments performs the PU splitting described with reference to FIGS. 15 to 31 (3220). The PU splitting process according to the embodiments is the same as or similar to the method of determining the split mode described with reference to FIGS. 17 and 24 to 25. Also, the PU splitting process 3220 is included in the geometry encoding process described with reference to FIGS. 1 to 15. The PU splitting process 3220 includes the following operations. The point cloud data processing device may determine whether to perform PU splitting for the entire frame or a specific node size in the octree structure, and determine a PU split range (search range). Then, it may identify the characteristics of distribution of the point cloud data in the corresponding region and determine a PU split range (search range) and axis (axes) (3221). Information related to PU splitting may be signaled at various levels such as a sequence level and a tile level through a bitstream. Since the information related to PU splitting is the same as that described with reference to FIGS. 26 to 31, a description thereof will be skipped. When the point cloud data processing device determines an axis serving as a splitting criterion, it calculates the cost required for each mode when splitting is performed according to the split modes (e.g., Mode 0, Mode 1, Mode 2, etc.) described with reference to FIGS. 17 to 24, searches for best split mode with the lowest cost, and perform the splitting (3222). The point cloud data processing device performs motion estimation for each component on each of the split sub PUs (3223). When the motion estimation is completed, the device determines whether to perform additional splitting for each sub PU (3224). The point cloud data processing device may perform or skip the additional splitting. When the additional splitting is performed, the point cloud data processing device may determine the PU split range again according to the dotted arrow, identify the distribution characteristics of the point cloud data in the corresponding region, and determine an axis forming the basis of the splitting. When motion estimation for each PU is completed, the point cloud data processing device performs motion compensation using the obtained MV (3230), and perform attribute encoding based on the reconstructed geometry (or reconstructed point cloud data) (3240). The attribute encoding may be performed by transforming, quantizing, and entropy coding a residual between the source data and the predicted data.

The PU splitting process described with reference to FIGS. 15 to 31 may be applied to attribute encoding. The best mode according to the embodiments is determined based on the cost calculated based on an attribute value of a point present within a search range, rather than a distance between points. In the processing method illustrated in the figure, the respective operations may be performed sequentially, or at least one or more thereof may be performed simultaneously. The processing order of the operations may be changed.

Figure 33:
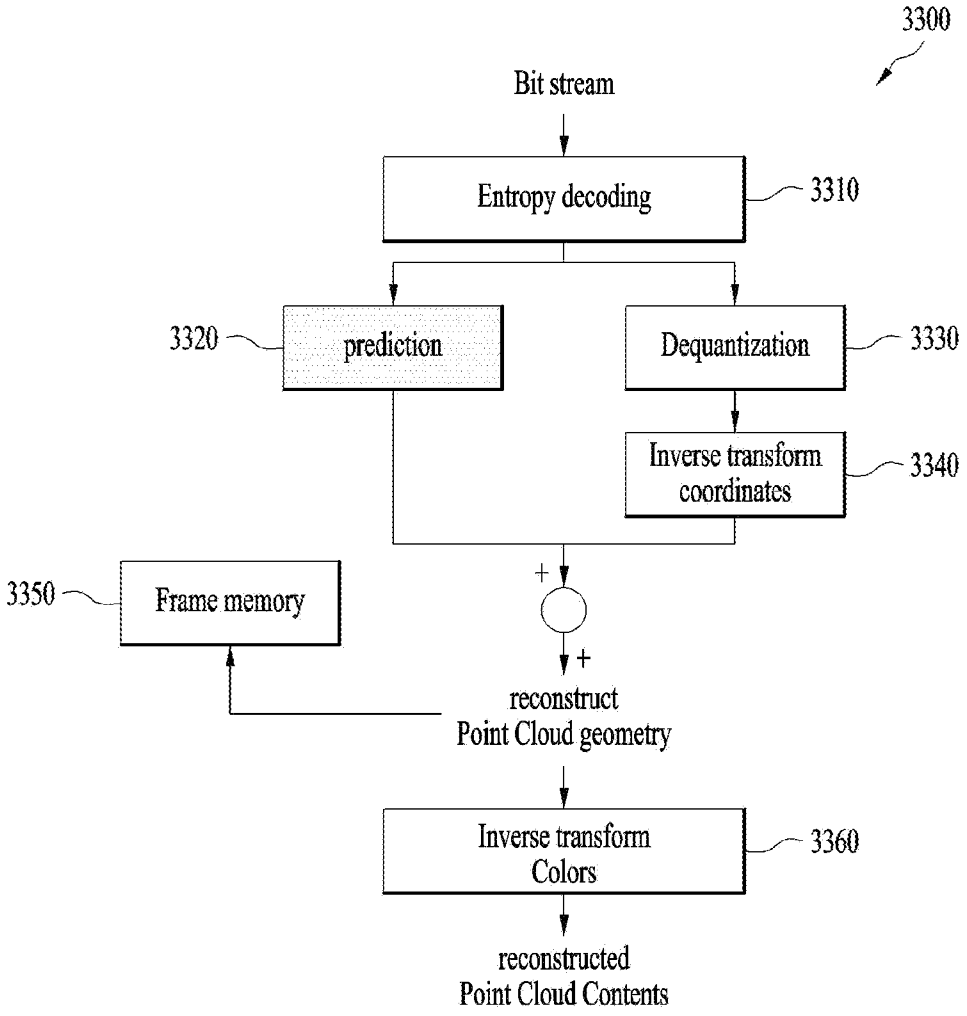
FIG. 33 is a flow diagram illustrating a point cloud processing method according to embodiments.

FIG. 33 is a flow diagram illustrating a point cloud processing method according to embodiments.

The flow diagram 3300 of FIG. 33 illustrates a processing method for a point cloud data processing device (e.g., the point cloud data reception device, the geometry decoder, the attribute decoder, or the like described with reference to FIGS. 1 to 14) configured to perform the PU splitting described with reference to FIGS. 15 to 31. The point cloud processing method illustrated in the figure may include the method of determining the split mode described with reference to FIGS. 17 and 24 to 25.

The point cloud data processing device (e.g., the geometry decoder) according to the embodiments may perform entropy decoding on the geometry contained in a received bitstream (3310), perform dequantization (3330) and inverse transformation (3340) to restore a residual, which is a prediction error for each point.

The geometry decoder according to the embodiments may include at least one of the arithmetic decoder 13002, the occupancy code-based octree reconstruction processor 13003, the surface model processor 13004, and the inverse quantization processor 13005 described with reference to FIG. 12. Although not shown in the figure, the geometry decoder may be implemented by hardware including one or more processors or integrated circuits configured to communicate with one or more memories included in the point cloud providing device, software, firmware, or a combination thereof.

The point cloud data processing device (e.g., the geometry decoder) may secure motion vector (MV) information (or MV) signaled for each PU and predict a point value in the PU range of the current frame (3320). The point cloud data processing device outputs the reconstructed point cloud geometry (or reconstructed geometry) by summing the predicted point value and the restored residual, and stores the same in a frame memory (3350). The stored reconstructed point cloud geometry is used for data prediction within the PU range of the next frame. When the reconstruction of the geometry is completed, the point cloud data processing device may inversely transform attributes (e.g., colors) to include the attributes in the position of the point indicated by the reconstructed geometry (3360). Reconstructed point cloud contents based on the reconstructed geometry and attributes are delivered to the renderer. In the processing method illustrated in the figure, the respective operations may be performed sequentially, or at least one or more thereof may be performed simultaneously. The processing order of the operations may be changed.

The point cloud data processing device described with reference to FIGS. 1 to 33 may generate a list of PUs having the same or similar MV in performing inter prediction based on PUs in order to increase the efficiency of compression of point cloud data having one or more frames, and thus perform MV signaling of a plurality of PUs using information about a single MV. As described above, PUs may be generated based on the octree structure. However, when the partitioned octree node is encoded and decoded without considering the distribution and characteristics of data constituting the point cloud content, the PUs may be split without considering the object of the point cloud content, and MV information should be signaled for each PU. Thus, even when the same MV is predicted, MV information should be signaled for each PU, and accordingly unnecessary signaling information is used. In addition, when a PU is split in a split structure (e.g., binary tree, quadtree, etc.) other than the octree structure, compression efficiency and quick data processing may be deteriorated because there is no signaling information for merging between PUs having the same MV.

In this regard, when there are one or more adjacent PUs having the same MV regardless of the PU splitting method, the point cloud data processing device according to the embodiments may merge (or group) the PUs and signal only one MV representing the merged PUs, thereby increasing coding efficiency. According to embodiments, the one MV representing the merged PUs may be referred to as a merged motion vector (MMV). Also, the point cloud data processing device may define one MV in an object unit between frames by merging PUs (standardized PUs or non-standardized PUs) constituting the object. The indexes of the PUs to be merged according to the embodiments are registered in a merge PU list or merge list. The merge list is represented as MMV_list. According to embodiments, the number of merged PU lists is greater than or equal to 1, and each of the PU lists corresponds to a set of PUs constituting an object. Also, each merge list may be referenced in one or more frames. Information on the merge list and the MMV according to the embodiments are transmitted to the point cloud decoder through signaling information related to PU merging signaled through the above-described bitstream. The point cloud decoder (or the geometry decoder described with reference to FIG. 10) according to the embodiments may secure the signaling information related to PU merging from the bitstream and perform inter prediction using the MMV.

Figure 34:
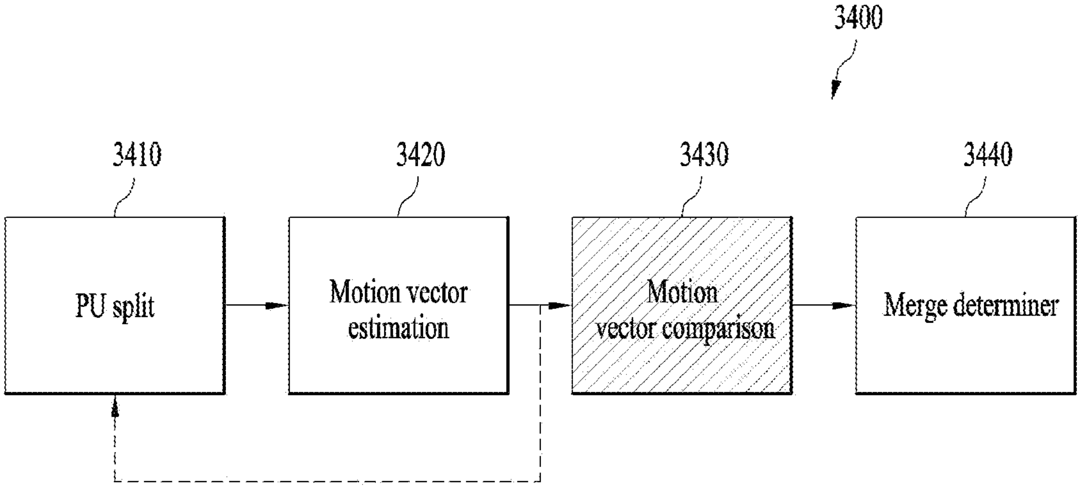
FIG. 34 illustrates an example of a PU merge part according to embodiments.

FIG. 34 illustrates an example of a PU merge part according to embodiments.

The PU merge part 3400 shown in FIG. 34 is included in the point cloud transmission device or the point cloud encoder described with reference to FIGS. 1 to 14, and may generate and merge PUs. Also, the PU merge part 3400 shown in FIG. 34 may be included in the geometry encoder. The geometry encoder is included in the point cloud encoder.

The geometry encoder according to the embodiments may include at least one of the coordinate transformer 40000, the quantizer 40001, the octree analyzer 40002, the surface approximation analyzer 40003, the arithmetic encoder 40004, and the geometry reconstructor 40005 described with reference to FIG. 4. At least any one or more of the parts 40005 may be included. The geometry encoder according to the exemplary embodiments may include at least one of the data input unit 12000, the quantization processor 12001, the voxelization processor 12002, the octree occupancy code generator 12003, and the surface model processor 12004, the intra/inter-coding processor 12005, and the arithmetic coder 12006 described with reference to FIG. 12. Although not shown in the figures, the geometry encoder may be implemented by hardware including one or more processors or integrated circuits configured to communicate with one or more memories included in the point cloud providing device, software, firmware, or a combination thereof.

The PU merge part 3400 includes a PU splitter (PU split) 3410, a motion vector estimation processor 3420, a motion vector comparator (motion vector comparison) 3430, and a merge determiner 3440. In FIG. 34 illustrating an example of the PU merge part 3400, the order of arrangement of the components may be changed, and the PU merge part 3400 may correspond to hardware, software, a process, or a combination thereof.

The PU splitter 3410 may split the point cloud data according to a preset PU shape. Also, the PU splitter 3410 may carry out the PU splitting method described with reference to FIGS. 15 to 33.

The motion vector estimation processor 3420 (e.g., the motion estimation processor 1730 described with reference to FIG. 17) performs motion estimation (or motion vector estimation) according to a preconfigured method (e.g., a preconfigured method in the point cloud encoder and the point cloud decoder) for inter prediction. Although not shown in the figure, an MV extracted according to the motion vector estimation and the cost value for determining whether to perform and/or skip additional splitting are delivered to the sub PU split determiner (e.g., the sub PU split determiner 1740 described with reference to FIG. 17). The sub PU split determiner checks the cost required when the MV extracted according to the motion vector estimation is applied, and determines whether to perform or skip additional splitting into sub PUs according to the cost. When the additional splitting is performed, the corresponding information is delivered to the PU splitter 3410, and the PU splitter 3410 recursively performs an operation for splitting again.

The motion vector comparator 3430 calculates a difference in MV between neighbor PUs to be compared with the MV determined for each PU and each sub PU to calculate a motion vector difference (MVD).

The merge determiner 3440 may select (determine) PUs to be merged based on the calculated MVD and a preconfigured criterion for determination.

Figure 35:
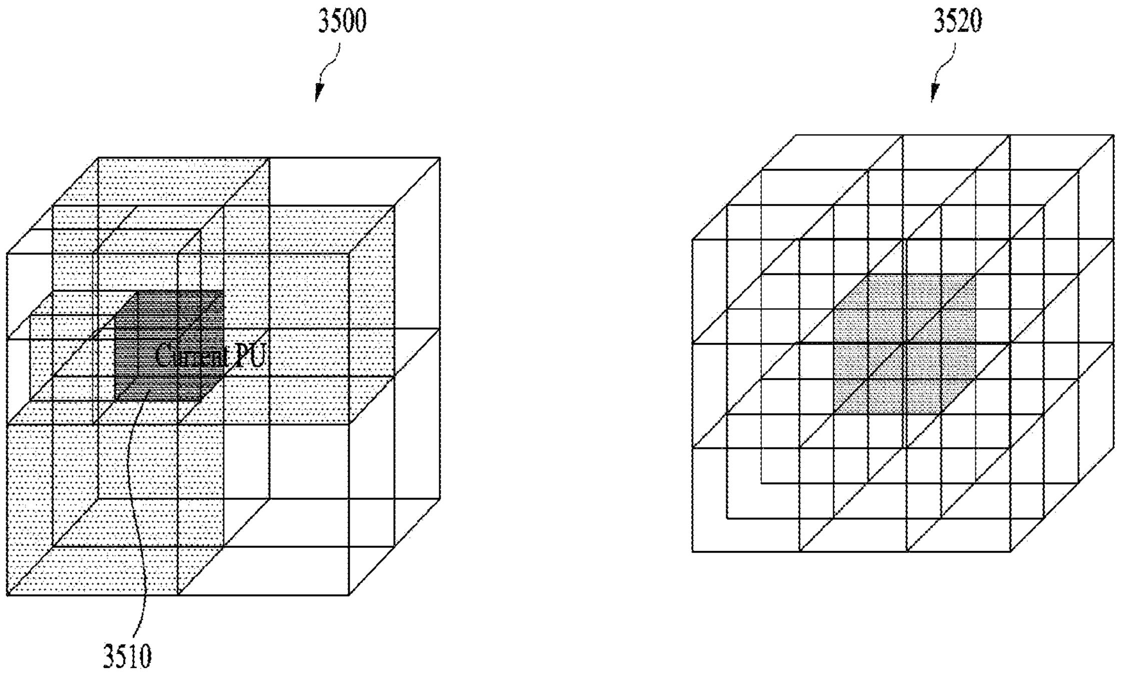
FIG. 35 illustrates an example of neighbor PUs.

FIG. 35 illustrates an example of neighbor PUs.

FIG. 35 illustrates an example of neighbor PUs for the merge described with reference to FIG. 34. The example 3500 on the left side of the figure shows 10 neighbor PUs for the current PU (CPU) 3510 (color-processed blocks around the current PU 3510), and the example 3520 on the right side of the figure shows 26 neighbor PUs for the CPU. That is, a neighbor PU according to the embodiments may be defined as a PU corresponding to a node having the same octree structure depth as the CPU or a parent node. Alternatively, when a PU has a cuboid shape, neighbor PUs may be defined as PUs that share at least one vertex or edge with the current PU. The calculated distance between the best MVs of the neighbor PU is less than a threshold, or the RDO calculated for the best MVs of the neighbor PUs is less than the threshold, or the best MVs of the neighbor PUs are exactly the same, the neighbor PUs are the target to be merged. The neighbor PUs according to the embodiments may be referred to as candidate PUs for merging.

Figure 36:
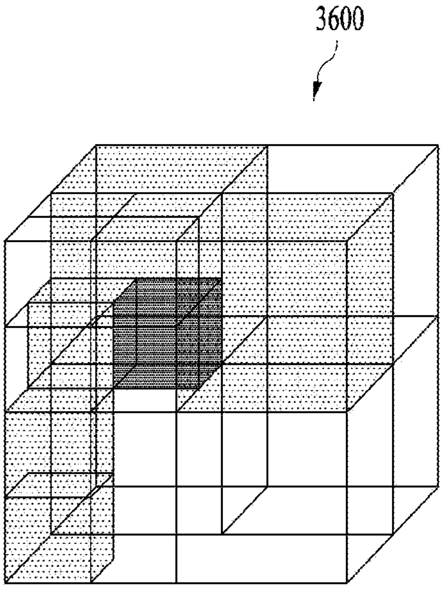
FIG. 36 illustrates an example of neighbor PUs.

FIG. 36 illustrates an example of neighbor PUs.

The example 3600 of FIG. 36 shows neighbor PUs to be merged among the neighbor PUs around the current PU 3510 described with reference to FIG. 35 (that is, the colored blocks around the current PU 3510 described with reference to FIG. 35, i.e., the block at the center in the figure). As described with reference to FIG. 35, even when a PU corresponding to a specific node meets the criterion for merging and becomes a merge target in the parent node or is a neighbor node to be merged as shown in the figure, it is excluded from the merging target if there are only PUs that are not adjacent to the current PU when the depth is the depth of the child node or is the same as the depth of a node corresponding to the current PU. In addition, the point cloud data processing device according to the embodiments may utilize sibling occupancy or PU index information to determine only neighbor PUs sharing a face with the current PU based on PU index information corresponding to the vicinity of the current PU as targets to be merged.

Figure 37:
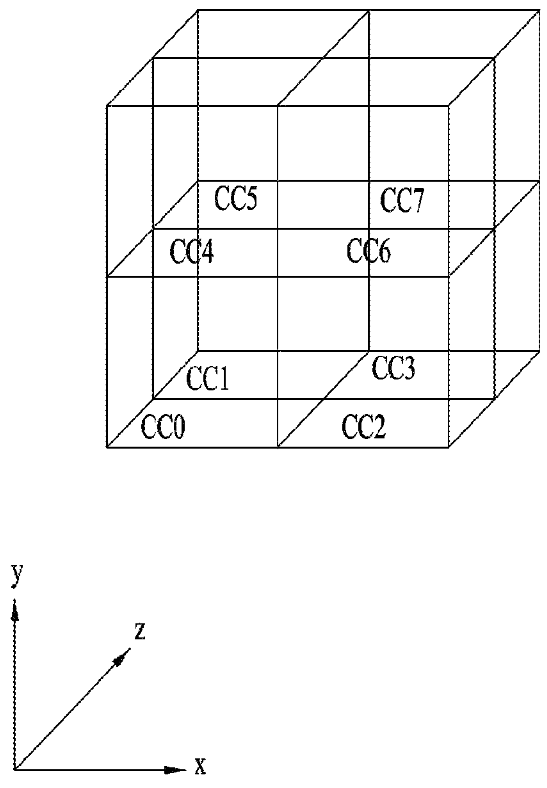
FIG. 37 illustrates an example of allocation of PU indexes.

FIG. 37 illustrates an example of allocation of PU indexes.

According to the embodiments, PU indexes may be sequentially allocated from CC0 to CC7 in this order or may be allocated according to a preconfigured system setting, a Morton code sorting order, other sort order, etc., and are not limited to this example.

Figure 38:
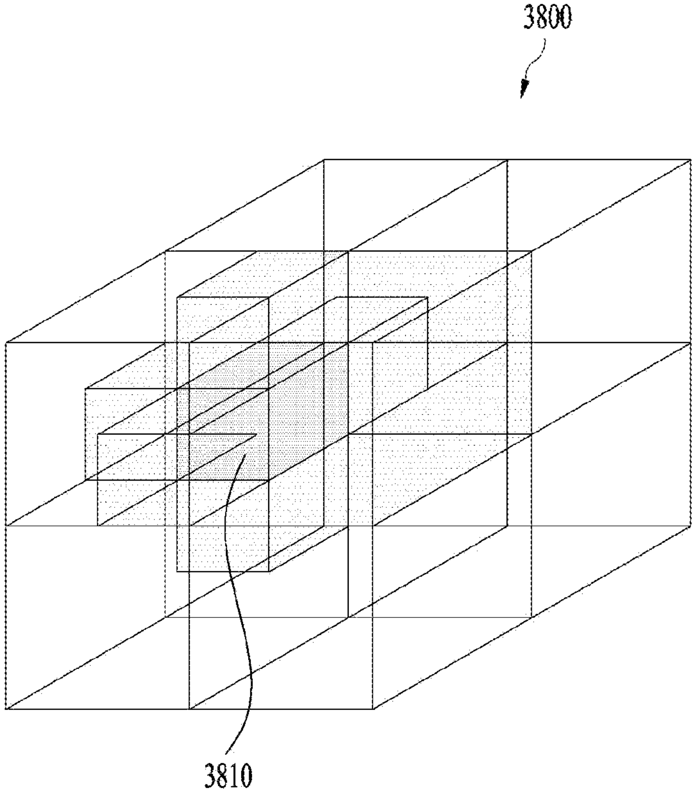
FIG. 38 illustrates an example of a neighbor PU.

FIG. 38 illustrates an example of a neighbor PU.

FIG. 38 shows an example 3800 of six neighbor PUs to be merged with the current PU 3810. When a PU sharing a face with the current PU 3810 and having an MV is selected as described with reference to FIGS. 35 to 37, the point cloud data processing device (e.g., the merge determiner 3440 described with reference to FIG. 34) selects a target to be merged by comparing the best MV determined for each PU with the MV of the current node. The point cloud data processing device may sequentially compare the MVs and update the comparison result to select a target to be merged, or may determine the best MVs for all PUs and compare the determined best MVs. The example in FIG. 38 shows a merge target determined after the best MVs for all PUs are selected. The PUs processed in the same color are neighbor PUs coded before the current PU 3810 or include a neighbor PU that shares at least one face with the current PU 3810.

Figure 39:
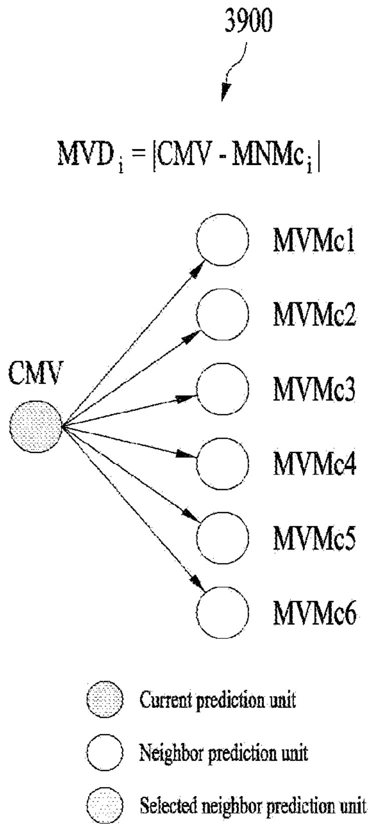
FIG. 39 illustrates an MV comparison process according to embodiments.

FIG. 39 illustrates an MV comparison process according to embodiments.

The process of FIG. 39 is an MV comparison process for the example 3800 of neighbor PUs shown in FIG. 38.

The left part of FIG. 39 is an example 3900 illustrating a process of comparing the MV (CMV) of the current PU with the MVs of all neighbor PUs. The point cloud data processing device (or the point cloud encoder or geometry encoder) according to the embodiments calculates a motion vector difference (MVD) between the MV (CMV) of the current PU and the MVs (MVMs) of the PUs which are MV merge targets as described with reference to FIG. 34. For example, suppose that there are 6 neighbor PUs neighboring the current PU. When the order of the indexes of the neighbor PUs is the same as the node search order, the point cloud data processing device registers it as an element of the temporary merged PU index list or array in the corresponding order. The point cloud data processing device compares the best MV (MVMci) found in each PU with the best MV (CMV) of the current PU to calculate each MVD (e.g., MVD1, which is a difference between CMV and MVMc1). The point cloud data processing device selects six calculated MVDs according to a preconfigured criterion (e.g., the MVD is equal to 0 or is less than a threshold). When the MVD is 0 or less than the threshold, the point cloud data processing device selects the corresponding PU as a PU to be merged.

The right side of FIG. 39 is an example 3910 illustrating four neighbor PUs (MVMc1, MVMc2, MVMc3, and MVMc6) selected through the comparison process.

Colored circles correspond to the four selected neighbor PUs. The point cloud data processing device according to the embodiments may signal indexes of the selected neighbor PUs, and there may be one or more PU indexes to be merged. As shown in the figure, when there are one or more PU indexes to be merged, the point cloud data processing device may input the indexes of the PUs to be merged at the end of the merge list such that the indexes of the PUs to be merged may be recorded in the sorting order or neighbor search order.

Figure 40:
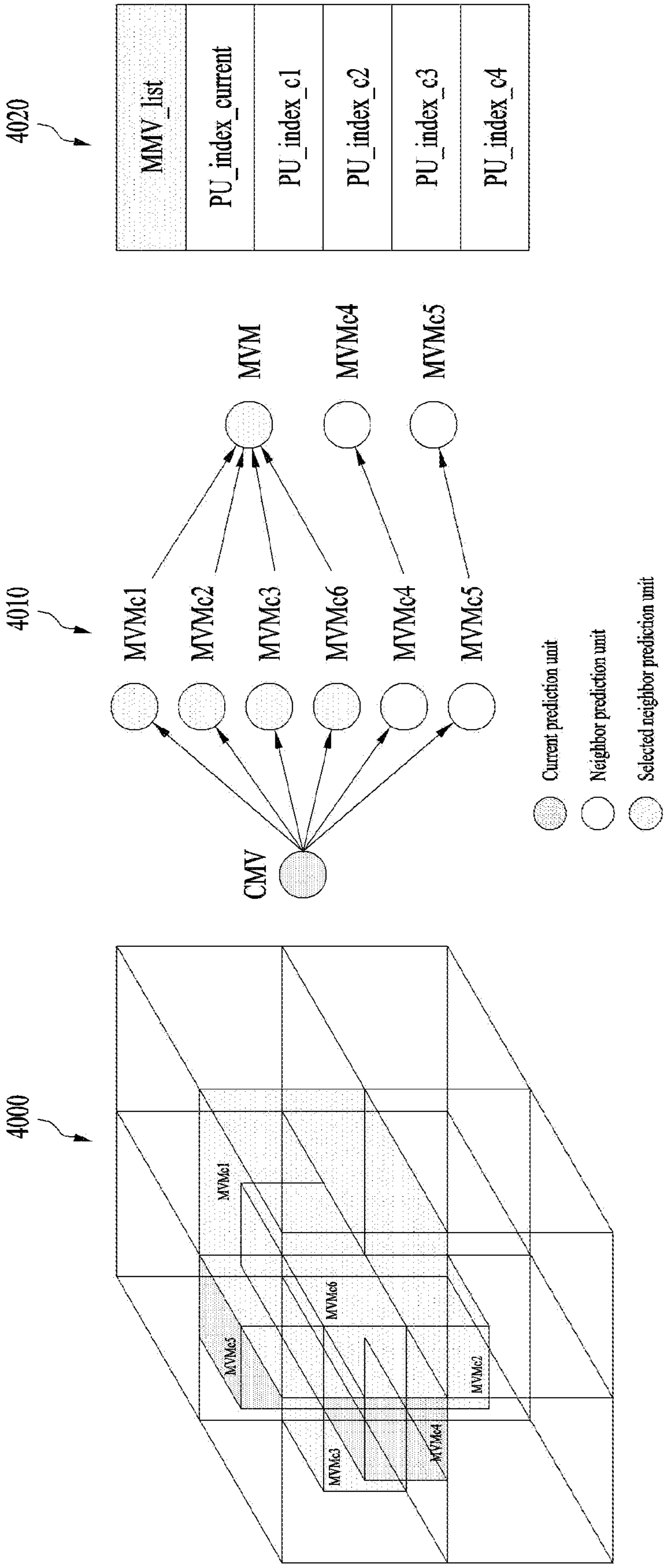
FIG. 40 shows an example of PUs to be merged and an example of a PU list.

FIG. 40 shows an example of PUs to be merged and an example of a PU list.

An example 4000 on the left side of FIG. 40 shows four neighbor PUs (MVMc1, MVMc2, MVMc3, MVMc6) that are selected through MVD calculation to be merged as described with reference to FIG. 39 and the current PU.

An example 4010 in the middle of FIG. 40 shows MVs of PUs to be merged and PUs that are not merged, and a list 4020 shown on the right side of FIG. 40 is an example of a merge list (MMV_list). The merge list 4020 according to the embodiments includes an index of the current PU (PU_index_current) and indexes of four PUs (PU_index_c1, PU_index_c2, PU_index_c3, PU_index_c6). As such, when the index of the current PU and the indexes of the four PUs are stored in a separate list or array, the point cloud data processing device may calculate the value of arithmetic mean or geometric mean of the MVs of the four PUs to be merged and may determine the calculated value as a merged motion vector (MMV), which is representative of the four PUs, or determine the MV of the current PU as an MMV. In this case, the point cloud data processing device only needs to signal the MV for the current PU. Therefore, as shown in the example 4010 in the figure, the point cloud data processing device may not signal each of 7 MVs for the current PU and 6 neighbor PUs, but may signal three MVs including the MV of the current PU and MVs (MVMv4, MVMc5) for the two neighbor PUs that are not merged. Accordingly, as the number of MVs to be signaled is reduced, the bitstream size and encoding time may be reduced, thereby increasing coding efficiency.

Thereafter, when a PU to be merged is additionally found through a neighbor PU search for the PUs that are already determined to be merged, the index of the PU is added to the end of the coded merge list (MMV_list), and the indexes of all PUs which are determined to be merged do not overlap in the merge list (MMV_list) or array. As described above, there may be one or more merge lists, and the number of merge lists is equal to the number of MMVs. According to embodiments, two or more merge lists may be integrated, or one merge list may be split. PUs belonging to the same merge list may be configured as a PU set for an object. Also, the merge list may be be shared among one or more frames.

The signaling information related to PU merging according to the embodiments may be included in signaling information of various levels (e.g., a sequence level, a slice level, etc.). The signaling information related to PU merging is transmitted to the point cloud reception device (e.g., the reception device 10004 of FIG. 1, the point cloud decoder of FIGS. 10 and 11, or the reception device of FIG. 13).

Figure 41:
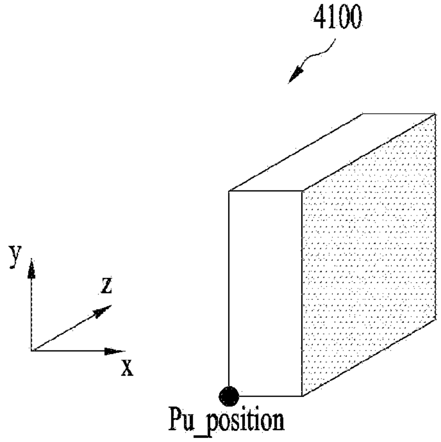
FIG. 41 shows an example of a syntax structure of signaling information related to PU merging.

FIG. 41 shows an example of a syntax structure of signaling information related to PU merging.

FIG. 41 show an example of a syntax structure of an SPS in which the signaling information related to PU merging is included at the sequence level.

MMV_flag: Indicates whether one MV or merged motion vector (MMV) is signaled for the same or similar MVs when the best MVs for respective PUs are searched for and the difference (MVD) between MVs is calculated.

When the value of MMV_flag is TRUE, it indicates that only one MMV is signaled for PUs having the same or similar MVs. When the value is FALSE, it indicates that PUs having the same or similar MVs are not integrated. num_of_MMV_list: Indicates the number of MMV_list (merge lists) in a slice, a frame, or entire point cloud content.

num_MMV_list_component: Indicates the number of PU components belonging to MMV_list. This value can change until a merge target is found for slice, frame, or entire point cloud content.

MMV: Indicates an MV representing each MMV_list. The value of MMV may be expressed as (x, y, z), (azimuth, radius, laserID) or coordinate values in a format required by the system.

MMV_threshold: Indicates a threshold compared with the calculated MVD to determine whether the PU is to be merged. When only a PU having the same MV is selected as an object to be merged, MMV_threshold may be 0. When a PU having an MVD smaller than some value is selected as an object to be merge, MMV_threshold may be a set value other than 0. When the MVD is less than MMV_threshold, the index of the PU may be added to the MMV_list. The value of MMV_threshold may be predetermined, or may be inferred or calculated in the system.

allow_use_next_frame: A flag for determining whether to allow another slice, tile, or frame to reference the MMV_list. When the value of allow_use_next_frame is TRUE, it indicates that another frame is allowed to reference MMV_list. When the value is FALSE, it indicates that the referencing is not allowed. When the referencing is allowed, the corresponding information is not deleted even after encoding and decoding of another frame is completed, but is delivered when another frame is encoded/decoded.

core_PU_index: Indicates a PU index representing MMV_list when the list is configured. When the PU index representing the MMV_list is positioned at the top in the MMV_list, signaling of the core_PU_index may be skipped.

PU_position: indicates a reference position for indicating the position of a PU in order to signal the position of each PU. An example 4100 on the right side of FIG. 41 shows PU_position given when coordinate information about a PU position is expressed as (x, y, z). PU_position may be a value closest to the origin among the PUs or may be a position indicating the center of the PUs. The coordinate information may vary depending on system requirements.

PU_size: indicates the size of the PU, which is information signaled together with the PU position. PU_size may be expressed as the width, height, and depth of the PU. The information may vary depending on the shape of the PU.

PU_index: An index for referring to (identifying) each PU. The index allocation method may be changed depending on the system-defined sorting method.

MMV_residual: Indicates the residual of each MV when MMV_threshold is set to a non-zero value. The format of the data may depend on the setting of the MMV data.

The SPS syntax according to the embodiments is not limited to the above example. It may further include additional elements or may not include some of the elements shown in the figure for efficiency of signaling. Some of the elements may be signaled through signaling information (e.g., APS, attribute header, etc.) or an attribute data unit other than the SPS.

FIG. 42 shows an example of a syntax structure of signaling information related to PU merging.

FIG. 42 shows an example of a syntax structure of a tile parameter set in which signaling information related to PU merging is included at the tile level. The signaling information related to PU merging is the same as that described with reference to FIG. 41, and thus a description thereof will be skipped. The tile parameter set syntax according to the embodiments is not limited to the above example. It may further include additional elements or may not include some of the elements shown in the figure for efficiency of signaling. Some elements may be signaled through signaling information (e.g., APS, attribute header, etc.) or an attribute data unit other than the tile parameter set.

FIG. 43 shows an example of a syntax structure of signaling information related to PU merging.

FIG. 43 shows an example of a syntax structure of a GPS in which signaling information related to PU merging is included at the sequence level. The signaling information related to PU merging is the same as that described with reference to FIG. 41, and thus a description thereof will be skipped. The GPS syntax according to the embodiments is not limited to the above example. It may further include additional elements or may not include some of the elements shown in the figure for efficiency of signaling. Some elements may be signaled through other signaling information (e.g., APS, attribute header, etc.) or an attribute data unit other than the GPS.

FIG. 44 shows an example of a syntax structure of signaling information related to PU merging.

FIG. 44 shows an example of a syntax structure of an APS in which signaling information related to PU merging is included at the sequence level. The signaling information related to PU merging is the same as that described with reference to FIG. 41, and thus a description thereof will be skipped. The APS syntax according to the embodiments is not limited to the above example. It may further include additional elements or may not include some of the elements shown in the figure for efficiency of signaling. Some of the elements may be signaled through signaling information, for example, a geometry slice data unit other than the APS.

FIG. 45 shows an example of a syntax structure of signaling information related to PU merging.

FIG. 45 shows an example of a syntax structure of a geometry slice header in which signaling information related to PU merging is included at the slice level. The signaling information related to PU merging is the same as that described with reference to FIG. 41, and thus a description thereof will be skipped. The geometry slice header syntax according to the embodiments is not limited to the above example. It may further include additional elements or may not include some of the elements shown in the figure for efficiency of signaling. Some elements may be signaled through signaling information other than the geometry slice header, for example, a geometry slice data unit.

FIG. 46 shows an example of a syntax structure of signaling information related to PU merging.

FIG. 46 shows an example of a syntax structure of geometry slice data in which signaling information related to PU merging is included at the slice level. The signaling information related to PU merging is the same as that described with reference to FIG. 41, and thus a description thereof will be skipped. The syntax of the geometry slice data according to the embodiments is not limited to the above example. It may further include additional elements or may not include some of the elements shown in the figure for efficiency of signaling. Some elements may be signaled through other signaling information (e.g., APS, attribute header, etc.) or an attribute data unit other than the geometry slice data.

Figure 47:
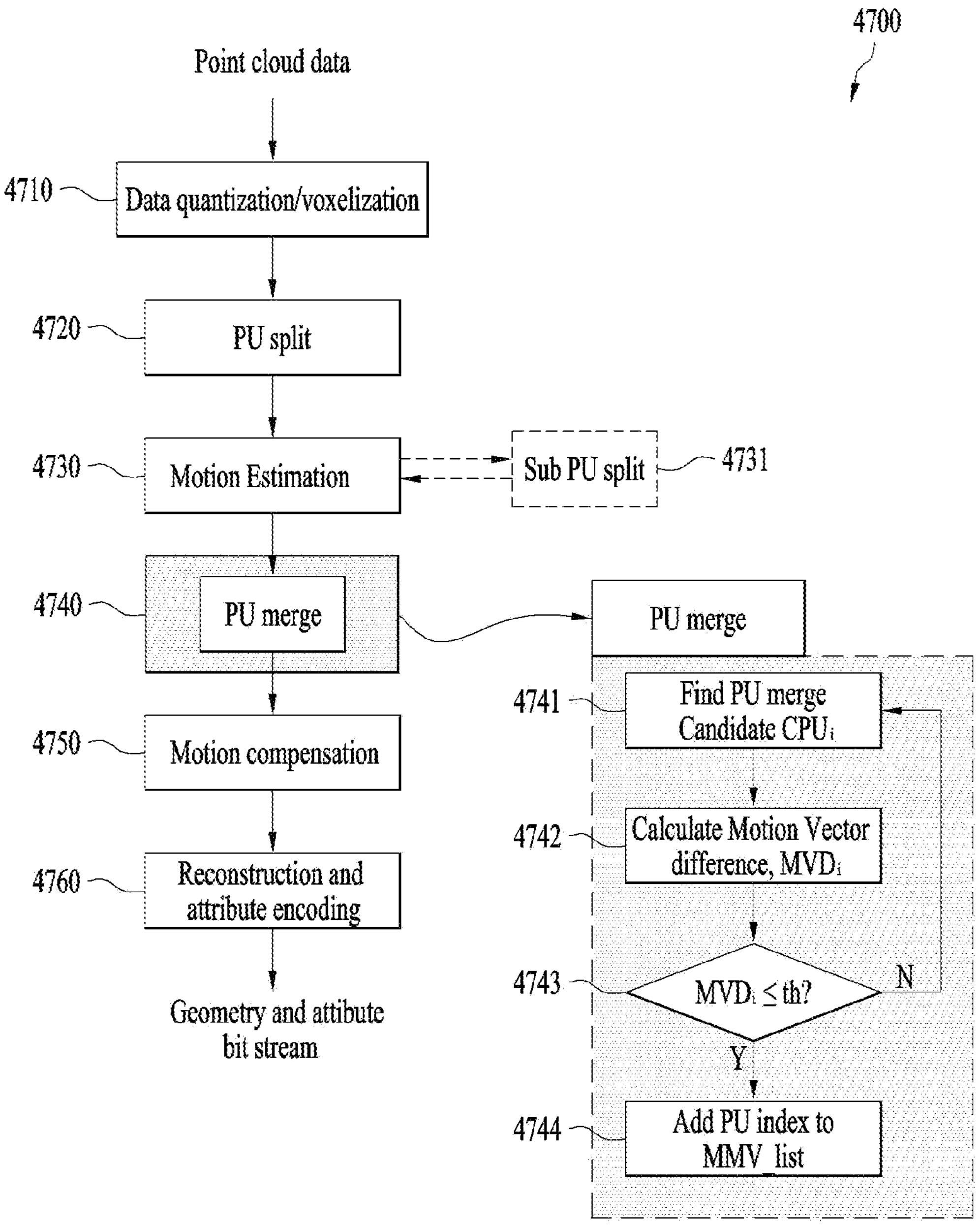
FIG. 47 is a flow diagram illustrating a point cloud processing method according to embodiments.

FIG. 47 is a flow diagram illustrating a point cloud processing method according to embodiments.

The flow diagram 4700 of FIG. 47 illustrates a processing method for a point cloud data processing device (e.g., the point cloud data transmission device, the point cloud encoder, the geometry encoder, or the like described with reference to FIGS. 1 to 14) configured to perform the PU merging described with reference to FIGS. 34 to 46. The point cloud processing method illustrated in the figure may include the method of determining the PU merging method described with reference to FIGS. 34 to 46.

The point cloud data processing device (e.g., the geometry encoder) according to the embodiments receives point cloud data as an input and performs data quantization/voxelization to facilitate compression of the geometry of the input point cloud data (4710).

The geometry encoder according to the embodiments may include at least one of the coordinate transformer 40000, the quantizer 40001, the octree analyzer 40002, the surface approximation analyzer 40003, the arithmetic encoder 40004, and the geometry reconstructor 40005 described with reference to FIG. 4. The geometry encoder according to the exemplary embodiments may include at least one of the data input unit 12000, the quantization processor 12001, the voxelization processor 12002, the octree occupancy code generator 12003, and the surface model processor 12004, the intra/inter-coding processor 12005, and the arithmetic coder 12006 described with reference to FIG. 12. Although not shown in the figures, the geometry encoder may be implemented by hardware including one or more processors or integrated circuits configured to communicate with one or more memories included in the point cloud providing device, software, firmware, or a combination thereof.

The point cloud data processing device (e.g., the geometry encoder) splits a PU by a preconfigured method (PU split) (4720). The point cloud data processing device may perform motion estimation on the split PU (4730). The point cloud data processing device may determine whether to perform sub PU splitting by comparing a value of a result of the motion estimation with a target value (4731). When the point cloud data processing device performs sub PU splitting, motion estimation is performed on the split sub PU. When motion estimation is completed, a cost is calculated, and it is determined whether to perform additional splitting or to perform motion compensation for the value, based on the cost. The sub PU splitting 4731 according to the embodiments may be performed or skipped.

The point cloud data processing device according to the embodiments performs PU merging based on a motion vector (MV) obtained by performing motion estimation for each PU and/or sub PU (4740). The PU merging 4740 is the same as the PU merging process described with reference to FIGS. 34 to 40. PU merging 4740 according to embodiments includes the following operations. The point cloud data processing device according to the embodiments performs screening from a PU having the least PU index to select a PU merge target, determines the PU having the least index as a current PU, and configures PUs neighboring the current PU as neighbor PUs to be merged, that is, candidate PUs (CPUs) (4741). The point cloud data processing device calculates a motion vector difference (MVD), which is a difference between the MV of the current PU and the MVs of the CPUs (4742). When the calculated MPD is less than or equal to a preset threshold, the point cloud data processing device selects the c PU as a PU to be merged and adds the index of the PU to MMV_list of the current PU (4744). Otherwise, the point cloud data processing device repeats the same operations for the next candidate PU (CPU) to check the MVD from all candidate PUs (CPUs) and complete the MMV_list. Thereafter, the point cloud data processing device performs the PU merging process 4740 again on a PU having the next index. When the PU having the next index is added to the MMV_list of the PU having the previous index, the MMV_list of the PU is added to the end of the MMV_list of the previous PU and managed. When the MMV_list is completed for all PU indexes, the corresponding information is delivered for motion compensation, and the point cloud data processing device performs the motion compensation (4750). The point cloud data processing device may perform attribute coding based on the reconstructed point cloud data (reconstructed geometry) (4760), and encode the residual between the source data and the predicted data through transform, quantization, and entropy encoding.

In the processing method illustrated in the figure, the respective operations may be performed sequentially, or at least one or more thereof may be performed simultaneously. The processing order of the operations may be changed. For example, the PU merging 4740 may be performed concurrently with the PU splitting 4720 and the motion estimation 4730.

Figure 48:
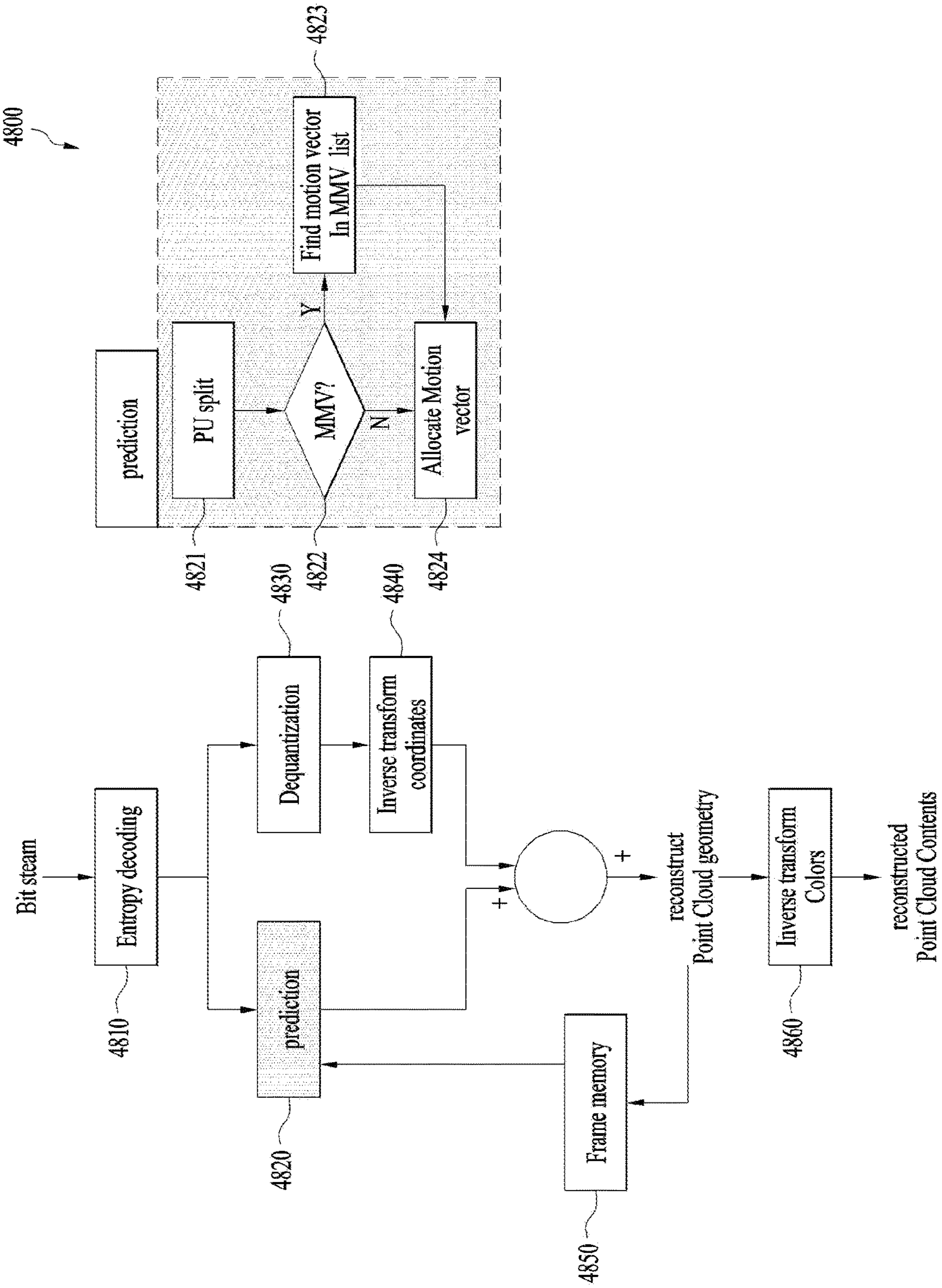
FIG. 48 is a flow diagram illustrating a point cloud processing method according to embodiments.

FIG. 48 is a flow diagram illustrating a point cloud processing method according to embodiments.

The flow diagram 4800 of FIG. 48 illustrates a processing method for a point cloud data processing device (e.g., the point cloud data reception device, the point cloud decoder, the geometry decoder, or the like described with reference to FIGS. 1 to 14) configured to perform the PU merging described with reference to FIGS. 34 to 46. The point cloud processing method illustrated in the figure may include the method of determining the PU merging method described with reference to FIGS. 34 to 46.

The point cloud data processing device (e.g., the geometry decoder) according to the embodiments may perform entropy decoding on a geometry included in a received bitstream (4810), perform dequantization (4830), and perform inverse transformation (4840), thereby restoring a residual, which is a prediction error for each point. The geometry decoder according to the embodiments may include at least one of the arithmetic decoder 13002, the occupancy code-based octree reconstruction processor 13003, the surface model processor 13004, and the inverse quantization processor 13005 described with reference to FIG. 12. Although not shown in the figure, the geometry decoder may be implemented by hardware including one or more processors or integrated circuits configured to communicate with one or more memories included in the point cloud providing device, software, firmware, or a combination thereof.

The point cloud data processing device (e.g., the geometry decoder) may secure motion vector (MV) information signaled for each PU or merged PU, and predict a point value in a PU range of the current frame (4820). As described with reference to FIGS. 34 to 46, MV information about each PU may be shared in the MMV_list and merged into one. Accordingly, the point cloud data processing device splits the PU (4821), and determines whether an MMV (or MMV_list) is present for each PU index (4822). When an MMV is present, the point cloud data processing device allocates an MV representing the MMV_list to the PU (4823). When the MMV is not present, the point cloud data processing device may allocate the signaled MV to the PU (4824). The point cloud data processing device outputs reconstructed point cloud geometry (or reconstructed geometry) by securing MVs for all PUs and adding the predicted point values and the restored residual, and stores the same in frame memory (4850). The reconstructed point cloud geometry may be stored together with the MMV_list and may be used as data prediction information within the PU range of the next frame. When the reconstruction of the geometry is completed, the point cloud data processing device may inversely transform attributes (e.g., color) to include the attribute in the position of the point indicated by the reconstructed geometry (4860). Reconstructed point cloud contents based on the reconstructed geometry and attributes are delivered to the renderer. In the processing method illustrated in the figure, the respective operations may be performed sequentially, or at least one or more thereof may be performed simultaneously. The processing order of the operations may be changed.

The PU splitting described with reference to FIGS. 15 to 33 and the PU merging described with reference to FIGS. 34 to 48 may be performed together. The signaling information related to PU splitting and the signaling information related to PU merging according to the embodiments may be included in signaling information of various levels (e.g., a sequence level, a slice level, etc.). The signaling information related to PU splitting and PU merging is transmitted to the point cloud reception device (e.g., the reception device 10004 of FIG. 1, the point cloud decoder of FIGS. 10 and 11, or the reception device of FIG. 13).

FIG. 49 shows a syntax structure of signaling information related to PU splitting and PU merging.

FIG. 49 shows an example of a syntax structure of an SPS in which signaling information related to PU splitting and signaling information related to PU merging are included at the sequence level. The signaling information related to PU splitting is the same as that described with reference to FIG. 26, and the signaling information related to PU merging is the same as that described with reference to FIG. 41. Thus, a description thereof will be skipped.

FIG. 50 shows a syntax structure of signaling information related to PU splitting and PU merging.

FIG. 50 shows an example of a syntax structure of a tile parameter set in which signaling information related to PU splitting and signaling information related to PU merging are included at the tile level. Although not shown in the figure, the syntax of the tile parameter set may include both the signaling information related to PU splitting and the signaling information related to PU merging shown in FIG. 49. The signaling information related to PU splitting is the same as that described with reference to FIG. 26, and the signaling information related to PU merging is the same as that described with reference to FIG. 41. Thus, a description thereof will be skipped.

FIG. 51 shows a syntax structure of signaling information related to PU splitting and PU merge merging.

FIG. 51 shows an example of a syntax structure of a GPS in which signaling information related to PU splitting and signaling information related to PU merging are included at the sequence level. The signaling information related to PU splitting is the same as that described with reference to FIG. 26, and the signaling information related to PU merging is the same as that described with reference to FIG. 41. Thus, a description thereof will be skipped.

FIG. 52 shows a syntax structure of signaling information related to PU splitting and PU merging.

FIG. 52 shows an example of a syntax structure of an APS in which signaling information related to PU splitting and signaling information related to PU merging are included at the sequence level. The signaling information related to PU splitting is the same as that described with reference to FIG. 26, and the signaling information related to PU merging is the same as that described with reference to FIG. 41. Thus, a description thereof will be skipped.

FIG. 53 shows a syntax structure of signaling information related to PU splitting and PU merging.

FIG. 53 shows an example of a syntax structure of a geometry slice header in which signaling information related to PU splitting and signaling information related to PU merging are included at the slice level. The signaling information related to PU splitting is the same as that described with reference to FIG. 26, and the signaling information related to PU merging is the same as that described with reference to FIG. 41. Thus, a description thereof will be skipped.

Figure 54:
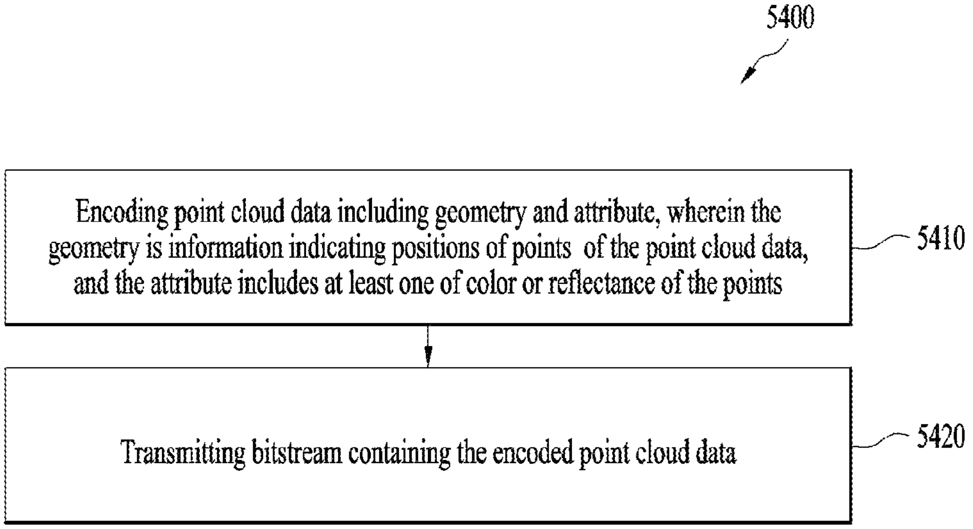
FIG. 54 is a flow diagram illustrating a point cloud data processing method according to embodiments.

FIG. 54 is a flow diagram illustrating a point cloud data processing method according to embodiments.

The flow diagram 5400 of FIG. 54 illustrates a cloud data processing method for a point cloud data processing device (or point cloud transmission device (e.g., the transmission device or point cloud encoder described with reference to FIGS. 1, 12 and 14). The point cloud data processing device encodes point cloud data including geometry and attributes (5410). The geometry is information indicating positions of points in the point cloud data, and the attributes include at least one of a color and a reflectance of the points. The point cloud data processing device includes a geometry encoder configured to encode a geometry and an attribute encoder configured to encode an attribute based on the encoded geometry. As described with reference to FIGS. 1 to 53, the attribute encoding depends on the geometry encoding. The geometry encoder according to the embodiments may include at least one of the coordinate transformer 40000, the quantizer 40001, the octree analyzer 40002, the surface approximation analyzer 40003, the arithmetic encoder 40004, and the geometry reconstructor 40005 described with reference to FIG. 4. The geometry encoder according to the exemplary embodiments may include at least one of the data input unit 12000, the quantization processor 12001, the voxelization processor 12002, the octree occupancy code generator 12003, and the surface model processor 12004, the intra/inter-coding processor 12005, and the arithmetic coder 12006 described with reference to FIG. 12. Although not shown in the figures, the geometry encoder may be implemented by hardware including one or more processors or integrated circuits configured to communicate with one or more memories included in the point cloud providing device, software, firmware, or a combination thereof.

The attribute encoder is included in the point cloud encoder. The attribute encoder according to the embodiments may include at least one of the color transformer 40006, the attribute transformer 40007, the RAHT transformer 40008, the LOD generator 40009, the lifting transformer 40010, the coefficient quantizer 40011, and/or the arithmetic encoder 40012 described with reference to FIG. 4. In addition, the attribute encoder according to the embodiments may include at least one of the color transform processor 12008, the attribute transform processor 12009, the prediction/lifting/RAHT transform processor 12010, and the arithmetic coder 12011 described with reference to FIG. 12. Although not shown in the figures, the attribute encoder may be implemented by hardware including one or more processors or integrated circuits configured to communicate with one or more memories included in the point cloud providing device, software, firmware, or a combination thereof.

The geometry encoder and the attribute encoder may be implemented by separate communicatively connected hardware, a single piece of hardware, one or more processors configured to communicate with one or more memories, separate software, or a combination of at least one of the above components.

The geometry encoder according to the embodiments may voxelize a geometry, and split the voxelized geometry into one or more prediction units (PUs) according to the PU splitting described with reference to FIGS. 15 to 33 for inter prediction. Each PU is a unit of inter prediction. The geometry encoder may also determine a split mode for performing additional splitting on at least one split PU, and split the at least one split PU into one or more sub PUs according to the determined split mode. The sub PU is also a unit of inter prediction. The bitstream according to the embodiments may contain signaling information related to PU splitting (the signaling information related to PU splitting described with reference to FIGS. 26 to 31 and the signaling information related to PU splitting described with reference to FIGS. 49 to 53). For example, the bitstream contains information (e.g., pu_coding_flag in FIG. 26) indicating whether inter prediction is performed in a PU, information (e.g., frame_pu_split_flag described with reference to FIG. 26) indicating whether PU splitting into one or more PUs is applied at a specific level among one or more levels constituting the octree structure of geometry or a frame unit of the point cloud data, and information (e.g., initial_split_mode of FIG. 26) indicating a split mode. The PU splitting is the same as that described with reference to FIGS. 15 to 33, and thus a detailed description thereof will be skipped.

Also, the geometry encoder may perform PU merging described with reference to FIGS. 34 to 53. The geometry encoder searches for neighbor PUs for at least one split PU, secures an MV of the PU and MVs of the neighbor PUs, and obtains a difference between the MV of the PU and the MVs of the neighbor PUs (e.g., the above-described MVD) by comparison. When the difference is less than or equal to a preset value, the encoder may a list (e.g., MMV_list) including the indexes of the neighbor PUs, and generate an MV (e.g., the MMV described with reference to FIGS. 34 to 53) representing the generated list. As described above, the bitstream may contain signaling information related to PU merging (e.g., the signaling information related to PU merging described with reference to FIGS. 41 to 46 and the signaling information related to PU merging described with reference to FIGS. 49 to 53). The PU merging is the same as that described with reference to FIGS. 34 to 53, and thus a detailed description thereof will be skipped.

Figure 55:
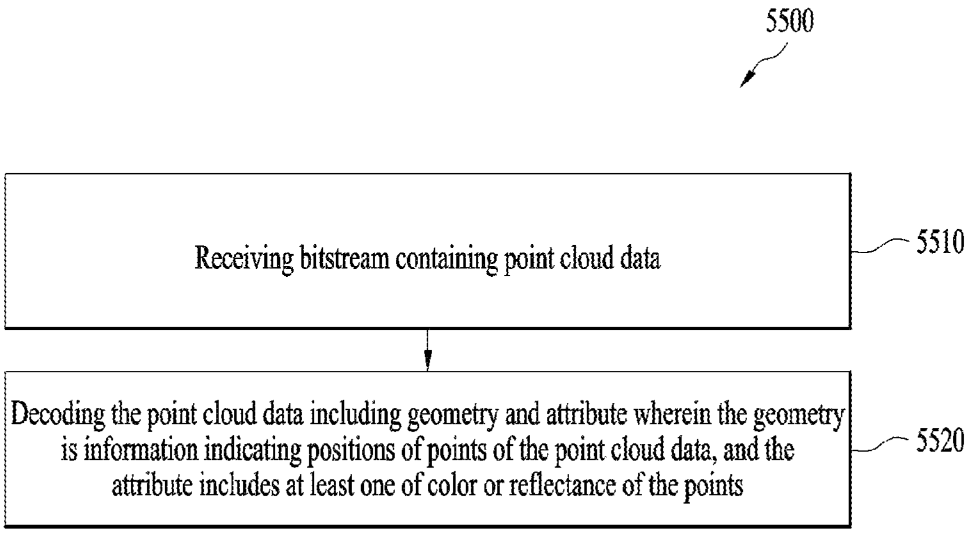
FIG. 55 is a flow diagram illustrating a point cloud data processing method according to embodiments.

FIG. 55 is a flow diagram illustrating a point cloud data processing method according to embodiments.

The flow diagram 5500 of FIG. 55 illustrates a point cloud data processing method for the point cloud data reception device (e.g., the reception device 10004 or the point cloud video decoder 10006) described with reference to FIGS. 1 to 53.

The point cloud data reception device (e.g., the receiver of FIG. 1, the receiver of FIG. 13, etc.) receives a bitstream containing point cloud data (5510).

The point cloud data reception device (e.g., the decoder of FIG. 10) decodes the point cloud data based on the signaling information (5520). The point cloud data reception device (e.g., the geometry decoder of FIG. 10) decodes a geometry included in the point cloud data. The point cloud data includes the geometry and attributes. The geometry is information indicating positions of points in the point cloud data, and the attributes include at least one of a color and a reflectance of the points. The point cloud decoder may include a geometry decoder (e.g., the geometry decoder of FIG. 10) configured to decode the geometry and an attribute decoder (e.g., the attribute decoder of FIG. 10) configured to decode the attributes based on the decoded geometry. The geometry decoder according to the embodiments may include at least one of the arithmetic decoder 13002, the occupancy code-based octree reconstruction processor 13003, the surface model processor 13004, and the inverse quantization processor 13005 described with reference to FIG. 12. The geometry decoder may secure MV information signaled for the operations of the entropy decoding 3310, the dequantization 3330, and the inverse transform 3340 described with reference to FIG. 33 and each PU, and predict a point value in a PU range of the current frame (3320). In addition, the geometry decoder may secure MV information signaled for each PU or the merged PU described with reference to FIG. 48 and predict a point value in the PU range of the current frame (4820). Although not shown in the figure, the geometry decoder may be implemented by hardware including one or more processors or integrated circuits configured to communicate with one or more memories included in the point cloud providing device, software, firmware, or a combination thereof.

The attribute decoder may include at least one of the arithmetic decoder 13007, the inverse quantization processor 13008, the prediction/lifting/RAHT inverse transform processor 13009 and the color inverse transform processor 13010 described with reference to FIG. 12. Although not shown in the figure, the attribute decoder may be implemented by hardware including one or more processors or integrated circuits configured to communicate with one or more memories included in the point cloud providing device, software, firmware, or a combination thereof.

The geometry decoder and the attribute decoder may be implemented by separate communicatively connected hardware, a single piece of hardware, one or more processors configured to communicate with one or more memories, separate software, or a combination of at least one of the above components.

The bitstream according to the embodiments may contain information related to PU splitting for splitting a geometry into one or more PUs for inter prediction (e.g., the signaling information related to PU splitting described with reference to FIGS. 26 to 31, the signaling information related to PU splitting described with reference to FIGS. 49 to 53). The information related to PU splitting includes information (e.g., pu_coding_flag described with reference to FIG. 26) indicating whether inter prediction is performed in the PU, information (e.g., frame_pu_split_flag described with reference to FIG. 26) indicating whether PU splitting is applied at a specific level among one or more levels constituting the octree structure of the geometry or a frame unit of the point cloud data, and information (e.g., initial_split_mode described with reference to FIG. 26) indicating a split mode of one or more PUs. A detailed description of the signaling information related to the PU splitting described with reference to FIGS. 26 to 31 and the signaling information related to the PU splitting described with reference to FIGS. 49 to 53 will be skipped. The geometry decoder according to the embodiments may split the geometry into one or more PUs. Also, the geometry decoder according to the embodiments may split at least one PU into one or more sub PUs. The PU and the sub PU according to the embodiments are units of inter prediction. The PU splitting according to the embodiments is the same as that described with reference to FIGS. 26 to 33, and thus a detailed description thereof will be skipped.

Also, the geometry decoder according to the embodiments may perform geometry decoding according to the PU merging described with reference to FIGS. 34 to 53. That is, the geometry decoder may split the geometry into one or more PUs. When a merged motion vector for the PUs is present, the decoder may allocate the merged motion vector to the split PU. The bitstream according to the embodiments may include signaling information related to PU merging (e.g., the signaling information related to PU merging described with reference to FIGS. 41 to 46 and the signaling information related to PU merging described with reference to FIGS. 49 to 53). The PU merging and the PU merging operation of the geometry decoder are the same as those described with reference to FIGS. 34 to 48, and thus a detailed description thereof will be skipped.

Point cloud data processing according to the embodiments described with reference to FIGS. 1 to 55. The components of the device may include one or more processors coupled with memory. It may be implemented by including hardware, software, firmware, or a combination thereof. The components of the device according to the embodiments are one chip, for example, one It can be implemented as a hardware circuit. In addition, point clouds according to embodiments Each of the components of the data processing apparatus may be implemented as separate chips. In addition The components of the point cloud data processing device according to the embodiments are at least one or more is one or more capable of executing one or more programs. It may consist of one or more processors, and one or more programs are Among the operations/methods of the point cloud data processing device described with reference to FIGS. To perform or to perform any one or more operations It may contain instructions.

Embodiments have been described from the method and/or device perspective, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

MODE FOR DISCLOSURE

As described above, related contents have been described in the best mode for carrying out the embodiments.

INDUSTRIAL APPLICABILITY

It will be apparent to those skilled in the art that various changes or modifications can be made to the embodiments within the scope of the embodiments. Thus, it is intended that the embodiments cover the modifications and variations of this disclosure provided they come within the scope of the appended claims and their equivalents.

The invention claimed is:

1. A method comprising:

encoding geometry data of a point of point cloud data in a bitstream; and encoding attribute data of the point of the point cloud data, wherein the bitstream includes first information related to an inter prediction being used for the point of the point cloud data, second information related to a merge for frames for the inter prediction, and third information related to a threshold for motion data, wherein first point cloud data related to the inter prediction is merged with second point cloud data related to the inter prediction, and wherein the second point cloud data is added to an end of an array related to the first point cloud data.

2. The method of claim 1, wherein the encoding the geometry data further comprises:

voxelizing the geometry data; and splitting the voxelized geometry data into one or more prediction units (PUs) for inter prediction, wherein each of the PUs is a unit of the inter prediction.

3. The method of claim 2, wherein the splitting of the voxelized geometry data into one or more PUs comprises:

determining a split mode for performing additional splitting on at least one of the split PUs; and splitting the at least one of the split PUs into one or more sub PUs according to the determined split mode, wherein each of the sub PUs is a unit of the inter prediction.

4. The method of claim 3, wherein the bitstream contains:

information indicating whether the inter prediction is performed in the PUs;

information indicating whether the splitting into the one or more PUs is applied at a specific level among one or more levels constituting an octree structure of the geometry data or a frame unit of the point cloud data; and information indicating the split mode.

5. The method of claim 2, wherein the encoding the geometry data comprises:

searching for neighbor PUs for at least one of the split PUS;

securing a motion vector of the PUs and motion vectors of the neighbor PUs and comparing a difference between the motion vector of the PUs and the motion vectors of the neighbor PUs; and based on the difference being less than or equal to a preset value, generating a list including indexes of the neighbor PUs and determining a motion vector representing the generated list, wherein the bitstream contains signaling information related to the list and the determined motion vector.

6. A device comprising:

a memory; and at least one processor connected to the memory, wherein the at least one processor is configured to:

encode geometry data of a point of point cloud data; and encode attribute data of the point of the point cloud data; and transmit a bitstream including the geometry data and the attribute data, wherein the bitstream includes first information related to an inter prediction being used for the points of the point cloud data, second information related to a merge for frames for the inter prediction, and third information related to a threshold for motion data, wherein first point cloud data related to the inter prediction is merged with second point cloud data related to the inter prediction, and wherein the second point cloud data is added to an end of an array related to the first point cloud data.

7. The device of claim 6, wherein the at least one processor is further configured to:

voxelize the geometry data; and split the voxelized geometry data into one or more prediction units (PUs) for inter prediction, wherein each of the PUs is a unit of the inter prediction.

8. The device of claim 7, wherein the at least one processor is further configured to:

determine a split mode for performing additional splitting on at least one of the split PUs; and split the at least one of the split PUs into one or more sub PUs according to the determined split mode, wherein each of the sub PUs is a unit of the inter prediction.

9. The device of claim 8, wherein the bitstream contains:

information indicating whether the inter prediction is performed in the PUs;

information indicating whether the splitting into the one or more PUs is applied at a specific level among one or more levels constituting an octree structure of the geometry data or a frame unit of the point cloud data; and information indicating the split mode.

10. The device of claim 7, wherein the at least one processor is further configured to:

search for neighbor PUs for at least one of the split PUs;

secure a motion vector of the PUs and motion vectors of the neighbor PUs and compare a difference between the motion vector of the PUs and the motion vectors of the neighbor PUs; and based on the difference being less than or equal to a preset value, generate a list including indexes of the neighbor PUs and determining a motion vector representing the generated list, wherein the bitstream contains signaling information related to the list and the determined motion vector.

11. A method comprising:

decoding geometry data of a point of point cloud data in a bitstream; and decoding attribute data of the point of the point cloud data, wherein the bitstream includes first information related to an inter prediction being used for the point of the point cloud data, second information related to a merge for frames for the inter prediction, and third information related to a threshold for motion data, wherein first point cloud data related to the inter prediction is merged with second point cloud data related to the inter prediction, and wherein the second point cloud data is added to an end of an array related to the first point cloud data.

12. The method of claim 11, wherein the bitstream contains information related to prediction unit (PU) splitting for splitting the geometry data into one or more PUs for inter prediction, wherein the information related to the PU splitting comprises:

information indicating whether the inter prediction is performed in the PUs;

information indicating whether the PU splitting is applied at a specific level among one or more levels constituting an octree structure of the geometry data or a frame unit of the point cloud data; and information indicating a split mode of the one or more Pus.

13. The method of claim 12, wherein the decoding the geometry data comprises:

splitting the geometry data into the one or more prediction units (PUs), wherein each of the PUs is a unit of the inter prediction.

14. The method of claim 13, wherein the decoding the geometry data further comprises:

splitting at least one of the split PUs into one or more sub PUS, wherein each of the sub PUs is a unit of the inter prediction.

15. The method of claim 11, wherein the decoding the geometry data comprises:

splitting the geometry data into one or more prediction units (PUs); and based on a merged motion vector being present for the PUs, allocating the merged motion vector to the PUs, wherein the merged motion vector is a motion vector allocated to at least one PU merged according to PU merging, and wherein the bitstream contains information related to merging the PU merging.

16. A device comprising:

a memory; and at least one processor connected to the memory, wherein the at least one processor is configured to:

receive a bitstream including a geometry data and an attribute data; and decode the geometry data of a point of point cloud data; and decode the attribute data of the point of the point cloud data, wherein the bitstream includes first information related to an inter prediction being used for the point, second information related to a merge for frames for the inter prediction, and third information related to a threshold for motion data, wherein first point cloud data related to the inter prediction is merged with second point cloud data related to the inter prediction, and wherein the second point cloud data is added to an end of an array related to the first point cloud data.

17. The device of claim 16, wherein the bitstream contains information related to prediction unit (PU) splitting for splitting the geometry data into one or more PUs for inter prediction, wherein the information related to the PU splitting comprises:

information indicating whether the inter prediction is performed in the PUs;

information indicating whether the PU splitting is applied at a specific level among one or more levels constituting an octree structure of the geometry data or a frame unit of the point cloud data; and information indicating a split mode of the one or more Pus.

18. The device of claim 17, wherein the at least one processor is further configured to split the geometry data into the one or more prediction units (PUs), wherein each of the PUs is a unit of the inter prediction.

19. The device of claim 18, wherein the at least one processor is further configured to split at least one of the split PUs into one or more sub PUS, wherein each of the sub PUs is a unit of the inter prediction.

20. The device of claim 16, wherein the at least one processor is further configured to:

split the geometry into one or more prediction units (PUs); and based on a merged motion vector being present for the PUs, allocate the merged motion vector to the PUs, wherein the merged motion vector is a motion vector allocated to at least one PU merged according to PU merging, and wherein the bitstream contains information related to merging the PU merging.

* * * * *